United States Patent
Arakawa

(10) Patent No.: US 10,830,417 B2
(45) Date of Patent: Nov. 10, 2020

(54) WAVELENGTH CONVERTER, LIGHT SOURCE APPARATUS, AND PROJECTOR

(71) Applicant: SEIKO EPSON CORPORATION, Tokyo (JP)

(72) Inventor: Osamu Arakawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/534,152

(22) Filed: Aug. 7, 2019

(65) Prior Publication Data
US 2020/0049323 A1 Feb. 13, 2020

(30) Foreign Application Priority Data
Aug. 8, 2018 (JP) ................................. 2018-149668

(51) Int. Cl.
  F21V 7/22 (2018.01)
  G03B 21/20 (2006.01)
  G02B 5/26 (2006.01)
(52) U.S. Cl.
  CPC .................. F21V 7/22 (2013.01); G02B 5/26 (2013.01); G03B 21/2066 (2013.01)

(58) Field of Classification Search
None
See application file for complete search history.

(56) References Cited

U.S. PATENT DOCUMENTS

| 9,651,853 B2* | 5/2017 | Arakawa | G03B 21/204 |
| 9,869,454 B2* | 1/2018 | Kim | F21V 9/30 |
| 2016/0123557 A1* | 5/2016 | Xu | C09K 11/02 362/84 |

FOREIGN PATENT DOCUMENTS

JP 2015-195098 A 11/2015

* cited by examiner

*Primary Examiner* — Vip Patel
(74) *Attorney, Agent, or Firm* — Oliff PLC

(57) ABSTRACT

A wavelength converter according to an aspect of the present disclosure includes a wavelength conversion layer that converts excitation light in terms of wavelength to generate fluorescence, and a first reflection member that reflects the fluorescence and is so provided as to incline with respect to a light exiting surface which is a surface of the wavelength conversion layer and via which the fluorescence exits.

13 Claims, 9 Drawing Sheets

WAVELENGTH CONVERTER, LIGHT SOURCE APPARATUS, AND PROJECTOR

The present application is based on, and claims priority from JP Application Serial Number 2018-149668, filed Aug. 8, 2018, the disclosure of which is hereby incorporated by reference herein in its entirety.

BACKGROUND

1. Technical Field

The present disclosure relates to a wavelength converter, a light source apparatus, and a projector.

2. Related Art

JP-A-2015-195098 discloses a light source apparatus in which fluorescence generated by irradiating a phosphor with excitation light is used as illumination light.

JP-A-2015-195098 is an example of the related art.

A phosphor typically emits fluorescence in the form of Lambert radiation and is therefore likely to cause large etendue. Large etendue does not allow an optical system disposed at the downstream of the phosphor to fail to capture part of the fluorescence, resulting in a decrease in the fluorescence use efficiency.

To avoid the problem described above, it is conceivable to reduce the excitation light incident area of the phosphor to reduce the etendue, but the reduction in the excitation light incident area causes an increase in the optical density of the excitation light, resulting in a problem of an increase in the influence of a phenomenon called optical extinction. The optical extinction is a phenomenon in which the fluorescence emission efficiency lowers when an excited phosphor absorbs fluorescence because the electrons are re-excited to the conduction band accompanied by no light emission. It is therefore difficult for the light source apparatus of the related art to reduce the etendue with the influence of the optical extinction suppressed.

SUMMARY

A wavelength converter according to an aspect of the present disclosure includes a wavelength conversion layer that converts excitation light in terms of wavelength to generate fluorescence and a first reflection member that reflects the fluorescence and is so provided as to incline with respect to a light exiting surface which is a surface of the wavelength conversion layer and via which the fluorescence exits.

In the wavelength converter according to the aspect of the present disclosure, the first reflection member may be provided at the wavelength conversion layer.

The wavelength converter according to the aspect of the present disclosure may further include a convex member made of a material different from a material of which the wavelength conversion layer is made and provided at a side facing the light exiting surface of the wavelength conversion layer, and the first reflection member may be provided at the convex member.

The wavelength converter according to the aspect of the present disclosure may further include a translucent member that transmits the fluorescence and is provided at a side facing the light exiting surface of the wavelength conversion layer, and the first reflection member may be provided at the translucent member.

The wavelength converter according to the aspect of the present disclosure may further include an optical element that is disposed at a side facing the light exiting surface of the wavelength conversion layer and changes a traveling direction of at least the fluorescence reflected off the first reflection member.

The wavelength converter according to the aspect of the present disclosure may further include an optical element that is so disposed as to face the translucent member and changes a traveling direction of at least the fluorescence reflected off the first reflection member, and a low-refractive-index layer provided between the translucent member and the optical element and having a refractive index smaller than a refractive index of the optical element.

The wavelength converter according to the aspect of the present disclosure may further include a light guide that guides the fluorescence, and a second reflection member that reflects the fluorescence to cause the reflected fluorescence to enter the light guide.

The wavelength converter according to the aspect of the present disclosure may further include a light guide that guides the fluorescence, and the first reflection member may be buried in a light incident section of the light guide. The wavelength converter according to the aspect of the present disclosure may further include a third reflection member provided at a portion of a side surface of the light guide that is a portion close to the light incident surface.

In the wavelength converter according to the aspect of the present disclosure, the second reflection member may be so provided as to incline in such a way that an amount by which the second reflection member separates away from a center axis of the light guide increases with distance from the light exiting surface of the wavelength conversion layer in a direction of the center axis.

In the wavelength converter according to the aspect of the present disclosure, a reflection region formed of a plurality of the first reflection members may be a latticed region in a plan view along a direction in which the fluorescence exits.

A light source apparatus according to another aspect of the present disclosure includes a light source that outputs excitation light, and the wavelength converter according to the aspect of the present disclosure.

A projector according to another aspect of the present disclosure includes the light source apparatus according to the aspect of the present disclosure, a light modulator that modulates light outputted from the light source apparatus in accordance with image information, and a projection optical apparatus that projects the light modulated by the light modulator.

DESCRIPTION OF EXEMPLARY EMBODIMENTS

Figure 1:
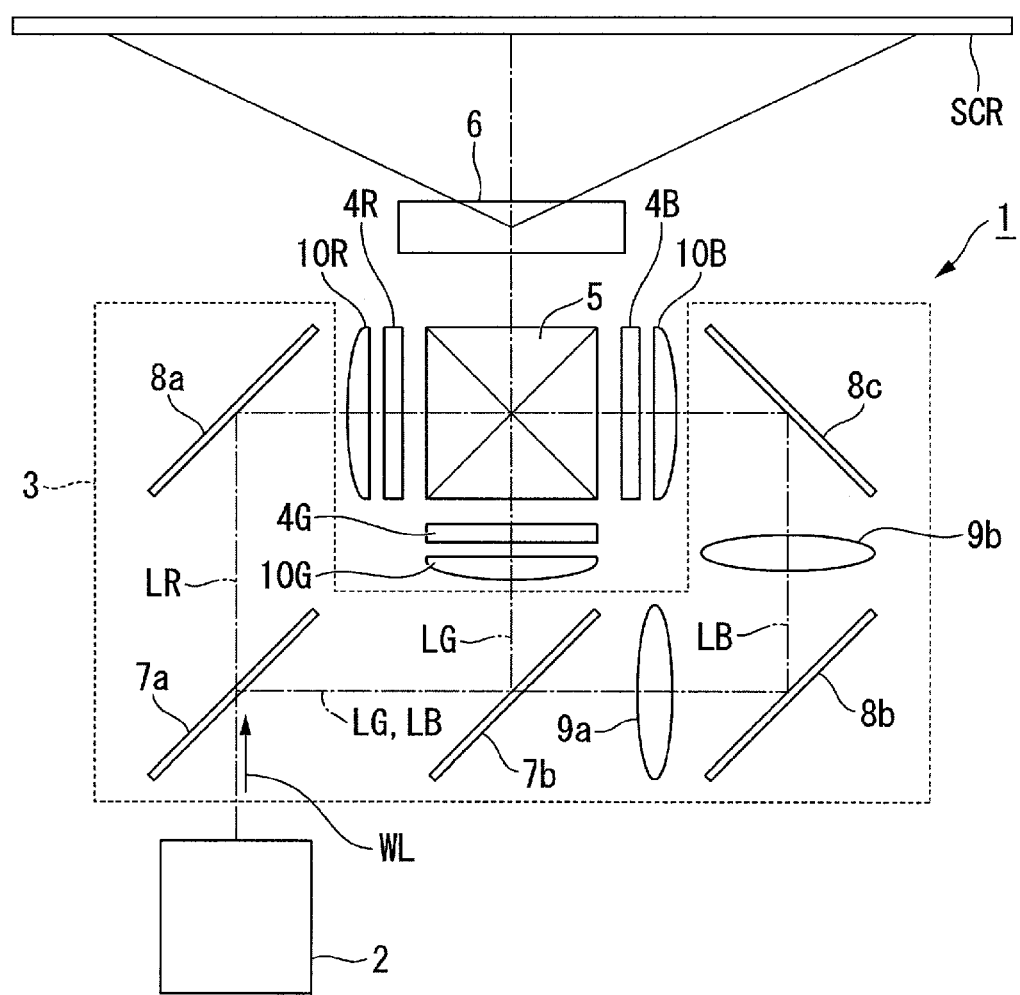
FIG. 1 shows a schematic configuration of a projector according to a first embodiment.

Embodiments of the present disclosure will be described below in detail with reference to the drawings. In the drawings used in the following description, a characteristic portion is enlarged for convenience in some cases for clarity of the characteristic thereof, and the dimension ratio and other factors of each component are therefore not always equal to actual values.

First Embodiment

FIG. 1 shows a schematic configuration of a projector according to an embodiment of the present disclosure. A projector 1 according to a first embodiment is a projection-type image display apparatus that displays color video images on a screen SCR, as shown in FIG. 1. The projector 1 includes an illumination apparatus 2, a color separation system 3, a light modulator 4R, a light modulator 4G, and a light modulator 4B, a light combining apparatus 5, and a projection optical apparatus 6.

The illumination apparatus 2 outputs illumination light WL containing at least red light LR, green light LG, and blue light LB (see FIG. 2) or three-primary-color light. The color separation system 3 separates the illumination light WL into the red light LR, the green light LG, and the blue light LB. In the present specification, the red light LR refers to visible red light having a peak wavelength longer than or equal to 590 nm but shorter than or equal to 700 nm, the green light LG refers to visible green light having a peak wavelength longer than or equal to 500 nm but shorter than or equal to 590 nm, and the blue light LB refers to visible blue light having a peak wavelength longer than or equal to 400 nm but shorter than or equal to 500 nm.

The color separation system 3 includes a first dichroic mirror 7a, a second dichroic mirror 7b, a first total reflection mirror 8a, a second total reflection mirror 8b, and a third total reflection mirror 8c. The first dichroic mirror 7a separates the illumination light WL from the illumination apparatus 2 into the red light LR and the other light (blue light LB and green light LG). The first dichroic mirror 7a reflects the blue light LB and the green light LG and transmits the red light LR. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

A first relay lens 9a and a second relay lens 9b are disposed in the optical path of the blue light LB on the downstream of the second dichroic mirror 7b.

The light modulator 4B modulates the blue light LB in accordance with image information to form blue image light. The light modulator 4G modulates the green light LG in accordance with image information to form green image light. The light modulator 4R modulates the red light LR in accordance with image information to form red image light. The light modulators 4B, 4G, and 4R are each formed, for example, of a transmissive liquid crystal panel.

Polarizers that are not shown are disposed at the light incident side and the light exiting side of each of the light modulators 4B, 4G, and 4R. Field lenses 10B, 10G, and 10R are disposed at the light incident side of the light modulators 4B, 4G, and 4R, respectively.

The image light from each of the light modulators 4B, 4G, and 4G enters the light combining apparatus 5. The light combining apparatus 5 combines the blue image light, the green image light, and the red image light with one another and causes the combined image light to exit toward the projection optical apparatus 6. The light combining apparatus 5 is formed, for example, of a cross dichroic prism.

The projection optical apparatus 6 enlarges the combined image light from the light combining apparatus 5 and projects the enlarged image light toward the screen SCR. Enlarged color video images are displayed on the screen SCR. The projection optical apparatus 6 is, for example, a lens unit formed of a lens barrel and a plurality of lenses disposed in the lens barrel.

Illumination Apparatus

Figure 2:
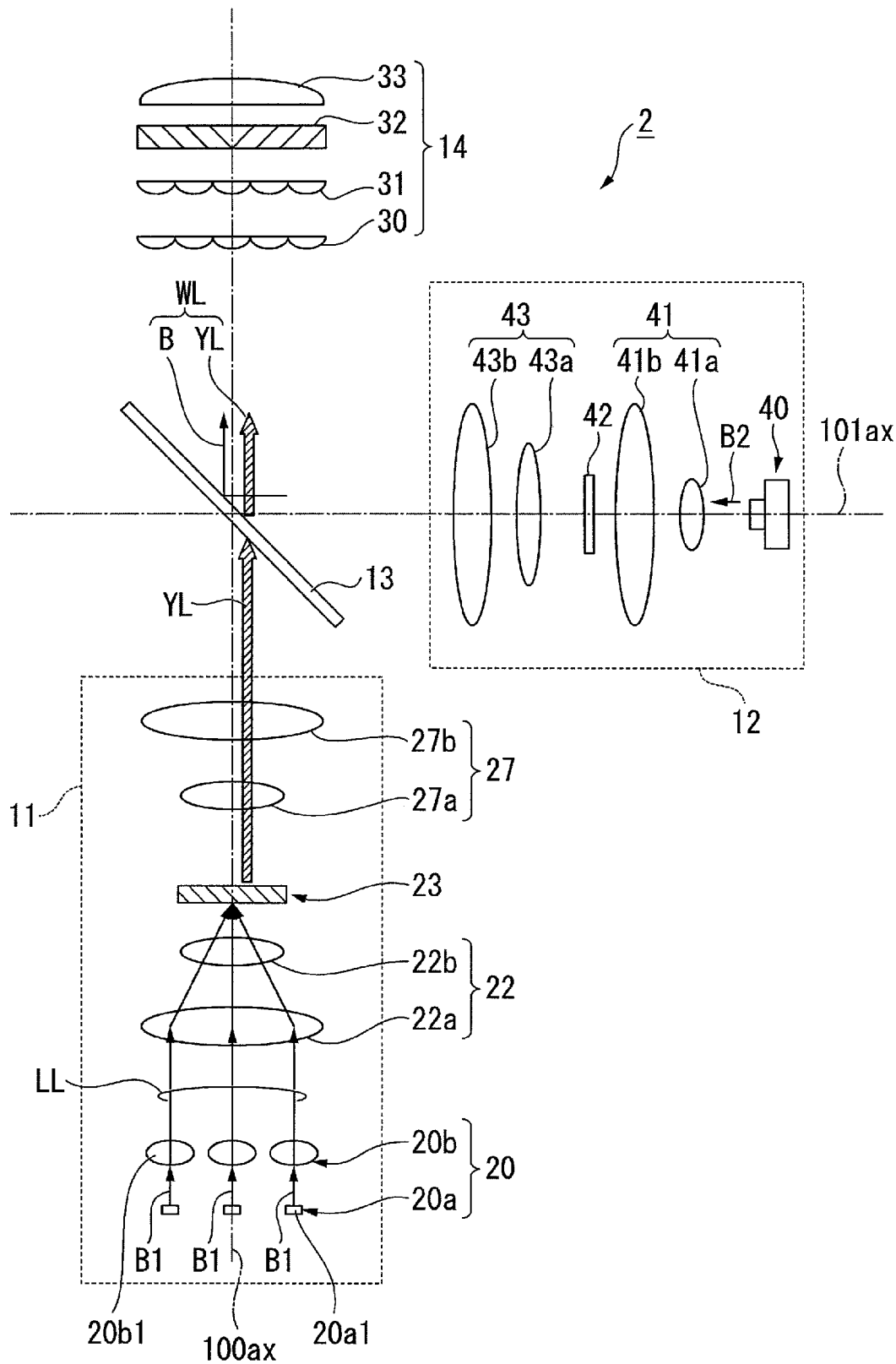
FIG. 2 shows a schematic configuration of an illumination apparatus.

FIG. 2 shows a schematic configuration of the illumination apparatus 2. The illumination apparatus 2 includes a first light source apparatus (light source apparatus) 11, a second light source apparatus 12, a dichroic mirror 13, and a homogenizing illuminator 14, as shown in FIG. 2.

The first light source apparatus 11 includes a first light source (light source) 20, a light collection system 22, a wavelength converter 23, and a pickup system 27.

The first light source 20 includes a light source unit 20a and a collimator system 20b. The light source unit 20a is formed of a plurality of semiconductor lasers 20a1, which each emit a blue light beam B1 formed of laser light. The intensity of the emitted blue light beam B1 peaks for example, at 445 nm. The plurality of semiconductor lasers 20a1 are arranged in an array in a single plane perpendicular to an illumination optical axis 100ax. The semiconductor lasers 20a1 can instead each be a semiconductor laser that emits blue light having a wavelength other than 445 nm, for example, 455 nm or 460 nm.

The collimator system 20b is formed of a plurality of collimator lenses 20b1. The collimator lenses 20b1 are arranged in an array in a single plane perpendicular to the illumination optical axis 100ax in correspondence with the semiconductor lasers 20a1. The collimator lenses 20b1 each convert the blue light beam B1 emitted from the corresponding semiconductor laser 20a1 into parallelized light. The thus configured first light source 20 in the present embodiment can output excitation light LL formed of the plurality of blue light beams B1.

The light collection system 22 collects the excitation light LL outputted from the first light source 20 and causes the collected excitation light LL to enter the wavelength converter 23. In the present embodiment, the light collection system 22 includes a first lens 22a and a second lens 22b, which are each formed, for example, of a convex lens. The configuration of the wavelength converter 23 will be described later.

The pickup system 27 includes, for example, a first collimation lens 27a and a second collimation lens 27b. The pickup system 27 is a parallelizing system that substantially parallelizes fluorescence YL outputted from the wavelength converter 23. The first collimation lens 27a and the second collimation lens 27b are each formed of a convex lens.

The fluorescence YL parallelized by the pickup system 27 is incident on the dichroic mirror 13. The dichroic mirror 13 is so disposed as to intersect each of an optical axis 101ax of the second light source apparatus 12 and the illumination optical axis 100ax of the illumination apparatus 2 at 45°. The dichroic mirror 13 is so characterized as to transmit the fluorescence YL and reflect the light from the second light source apparatus 12.

Wavelength Converter

Figure 3:
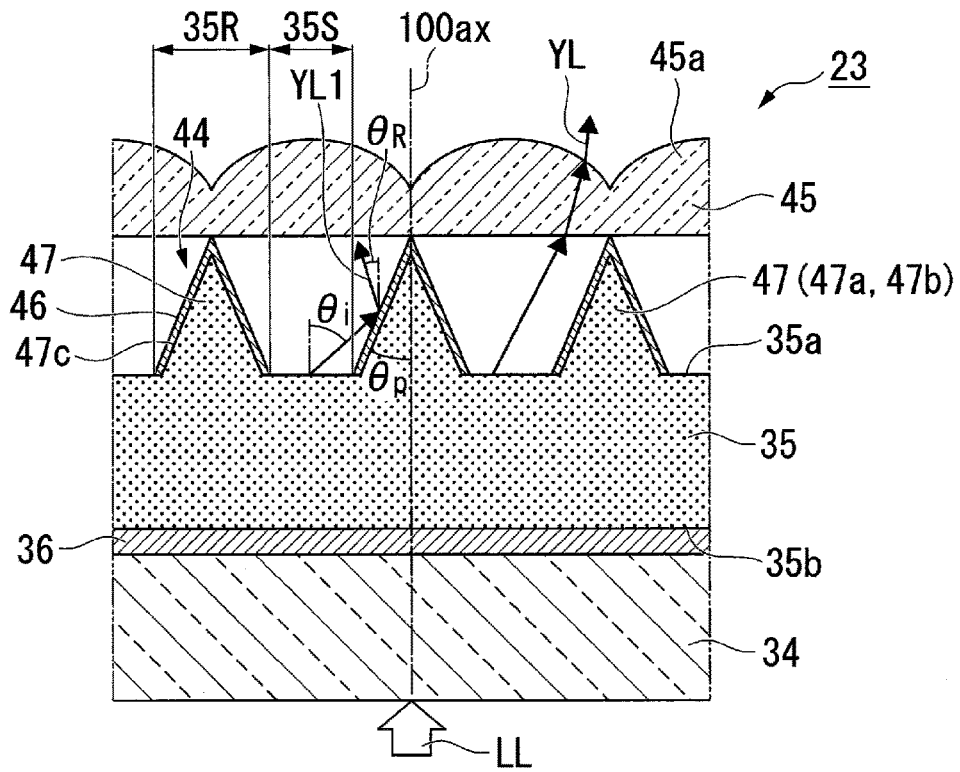
FIG. 3 is a cross-sectional view showing the configuration of a wavelength converter.

The configuration of the wavelength converter 23 will subsequently be described. FIG. 3 is a cross-sectional view showing the configuration of the wavelength converter. The wavelength converter 23 includes a base 34, a phosphor (wavelength conversion layer) 35, a dichroic film 36, a reflection structure 44, and a microlens (optical element) 45, as shown in FIG. 3. The phosphor 35 converts the excitation light LL into the fluorescence YL, which is yellow fluorescence that belongs to a wavelength band different from the wavelength band to which the blue light LB belongs. The wavelength converter 23 according to the present embodiment is a transmissive element on which the excitation light LL is incident on one side (lower side) thereof and from which the fluorescence YL exits via the other side (upper side) thereof.

The base 34 is a plate-shaped member and is a support that supports the phosphor 35. The base 34 is made of a material having high light translucency and thermal conductivity, for example, sapphire and single-crystal SiC. The dichroic film 36 is provided between the base 34 and the phosphor 35. The dichroic film 36 is provided on a bottom surface 35b of the phosphor 35. The dichroic film 36 is so optically characterized as to transmit the blue light LB and reflect the fluorescence YL. The dichroic film 36 may instead be provided on the upper surface (surface facing phosphor 35) of the base 34.

The phosphor 35 is made, for example, of a YAG-ceramic-based ceramic phosphor formed of a plurality of burned YAG phosphor particles.

Figure 4:
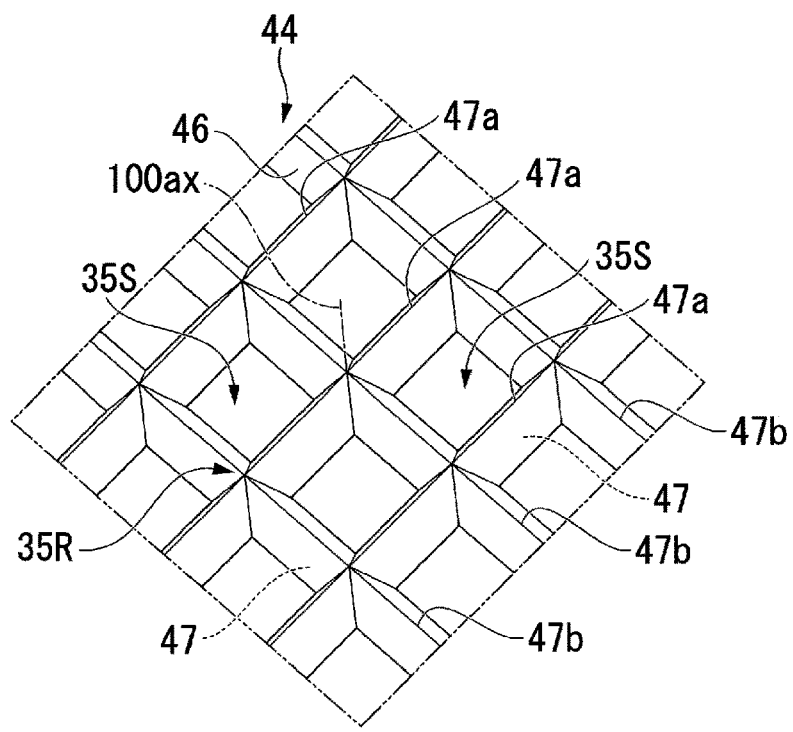
FIG. 4 is an enlarged perspective view showing the configuration of key parts of the wavelength converter.

FIG. 4 is an enlarged perspective view showing the configuration of key parts of the wavelength converter. The reflection structure 44 is a latticed structure in a plan view along the direction in which the fluorescence YL exits (illumination optical axis 100ax), as shown in FIG. 4. In the present embodiment, the reflection structure 44 is formed of convex members 47 and reflection layers (first reflection member) 46.

In the present embodiment, the convex members 47 are formed of part of the phosphor 35, as shown in FIG. 3. The convex members 47 include a plurality of first convex members 47a arranged on the upper surface of the phosphor 35 along a first direction and a plurality of second convex members 47b arranged on the upper surface of the phosphor 35 along a second direction perpendicular to the first direction, as shown in FIG. 4.

The first convex members 47a and the second convex members 47b are so disposed as to intersect each other. The convex members 47 as a whole have a lattice-like plan shape in the plan view along the direction in which the fluorescence YL exits. The direction in which the fluorescence YL exits refers to the direction along the illumination optical axis 100ax. The first convex members 47a each have an inverted-V-letter cross-sectional shape when taken along a plane perpendicular to the direction in which the first convex members 47a extend. Similarly, the second convex members 47b each have an inverted-V-letter cross-sectional shape when taken along a plane perpendicular to the direction in which the second convex members 47b extend.

The surface of each of the first convex members 47a and the second convex members 47b is an inclining surface that inclines with respect to a light exiting surface 35a of the phosphor 35 that is the surfaces via which the fluorescence YL exits. The surfaces (inclining surfaces) of the first convex members 47a and the second convex members 47b are collectively referred to as surfaces 47c of the convex members 47.

The reflection layers 46 are provided on the surfaces 47c of the convex members 47. The reflection layers 46 are each formed of a metal film made, for example, of Ag or Al, or a dielectric multilayer film and reflect the fluorescence YL having exited via light exiting regions 35S (light exiting surface 35a), which will be described later. In the present embodiment, since the surfaces 47c incline with respect to the light exiting surface 35a, the reflection layers 46 provided on the surfaces 47c incline with respect to the light exiting surface 35a.

Out of the upper surface of the phosphor 35, the portion where no reflection structure 44 is formed forms the light exiting regions 35S, via which the fluorescence YL exits. In the present embodiment, the light exiting regions 35S correspond to the light exiting surface 35a of the phosphor 35.

On the other hand, the portion where the reflection structure 44 is formed forms a reflection region 35R, which reflects the fluorescence YL having exited via the light exiting surface 35a. In the plan view along the direction in which the fluorescence YL exits (illumination optical axis 100ax), the reflection region 35R is a latticed region. That is, the light exiting regions 35S (light exiting surface 35a) are disposed in regions defined by the reflection region 35R. The reflection region 35R is therefore so provided as to surround the circumferences of the light exiting regions 35S.

Referring back to FIG. 3, the microlens 45 includes a plurality of lenslets 45a. The plurality of lenslets 45a are provided in correspondence with the light exiting regions 35S defined by the reflection structure 44. The lenslets 45a are each formed of a planoconvex lens having a convex upper surface and a flat lower surface.

The effect of the wavelength converter 23 will now be described. The excitation light LL passes through the base 34 and the dichroic film 36 and enters the phosphor 35. The majority of the fluorescence YL generated in the phosphor 35 exits via the light exiting regions 35S (light exiting surface 35a). Part of the fluorescence YL generated in the phosphor 35 travels downward, is then reflected off the dichroic film 36, and exits via the light exiting regions 35S (light exiting surface 35a).

Part of the fluorescence YL having exited via the light exiting regions 35S (light exiting surface 35a) passes through the microlens 45 and enters the pickup system 27, as shown in FIG. 3. The fluorescence YL exits via the light exiting surface 35a in the form of Lambert radiation and therefore contains a first component YL1 having a large exiting angle with respect to the light exiting surface 35a. The reflection layers 46 on the reflection structure 44 reflect the first component YL1.

Let now θP be the inclining surface angle between the direction H1 of a normal to the light exiting surface 35a of the phosphor 35 and the surfaces 47c of the convex members 47, θi be a first exiting angle of the first component YL1 with respect to the direction H1 of the normal, and θR be a second exiting angle of the first component YL1 reflected off the reflection layers 46 with respect to the direction H1 of the normal. For example, when the inclining surface angle θP is 30 degrees and the first exiting angle θi is 60 degrees, the second exiting angle θR of the reflected first component YL1 is 0 degrees. That is, the second exiting angle θR is smaller than the first exiting angle θi. The value of the inclining surface angle θP is an example and is not limited to the value described above. That is, the inclining surface angle θP can be adjusted as appropriate to the extent that the inclining surface angle θP provides the effect of causing the second exiting angle θR to be smaller than the first exiting angle θi.

The wavelength converter 23 according to the present embodiment, in which the reflection layers 46 reflect the first component YL1, which is part of the fluorescence YL and has a large exiting angle, allows a decrease in the second exiting angle θR of the first component YL1 with respect to the direction H1 of the normal. A decrease in the second exiting angle θR is equivalent to a decrease in the radiation angle of the fluorescence YL. When the radiation angle of the fluorescence YL decreases, an increase in the etendue decreases, whereby the efficiency at which the fluorescence YL is used is improved. Further, since the wavelength converter 23 according to the present embodiment allows reduction in the etendue with no decrease in the excitation light incidence area of the phosphor 35 on which the excitation light LL is incident, the optical extinction due to an increase in optical density of the excitation light can be suppressed. The wavelength converter 23 according to the present embodiment is therefore capable of reducing the etendue with the influence of the optical extinction suppressed.

Part of the fluorescence YL having exited via each of the light exiting regions 35S (light exiting surface 35a) directly enters the corresponding lenslet 45a of the microlens 45, as shown in FIG. 3. The remainder of the fluorescence YL having exited via each of the light exiting regions 35S (light exiting surface 35a) enters the corresponding lenslet 45a via the reflection layers 46. The lenslets 45a refract the fluorescence YL in a direction that causes a decrease in the exiting angle with respect to the direction H1 of a normal to the light exiting surface 35a. That is, the wavelength converter 23 according to the present embodiment, which includes the microlens 45, allows a decrease in the radiation angle of the fluorescence YL to reduce an increase in the etendue and improve the efficiency at which the fluorescence YL is used. The lenslets 45a may instead be so provided as to reflect only the first component YL1 reflected off the reflection layers 46 out of the fluorescence YL having exited via the light exiting regions 35S (light exiting surface 35a).

Further, in the wavelength converter 23 according to the present embodiment, since the reflection region 35R is so provided as to surround the circumferences of the light exiting regions 35S, the reflection region 35R can reflect the fluorescence YL having exited via the light exiting regions 35S in a variety of directions in the plan view. The radiation angle of the fluorescence YL having exited via each of the light exiting regions 35S therefore has a circular distribution. According to the reflection structure 44 in the present embodiment, the radiation angle of the fluorescence YL having exited via each of the light exiting regions 35S has an isotropic distribution, whereby the above-mentioned reduction in the etendue can be more readily achieved.

Referring back to FIG. 2, the second light source apparatus 12 includes a second light source 40, a second light collection system 41, a scatter plate 42, and a second pickup system 43.

The second light source 40 has the same configuration as that of the first light source 20 described above. In the present embodiment, the second light source 40 includes a semiconductor layer that emits blue light B2 and a collimator lens that parallelizes the blue light B2 emitted from the semiconductor laser. The second light source 40 may include at least one semiconductor layer and collimator lens or may include a plurality of semiconductor lasers and collimator lenses, as the first light source 20 does.

The second light collection system 41 includes a first lens 41a and a second lens 41b. The second light collection system 41 collects the blue light B2 from the second light source 40 in the vicinity of the scatter plate 42. The first lens 41a and the second lens 41b are each formed of a convex lens.

The scatter plate 42 scatters the blue light B2 from the second light source 40 in such a way that the scattered blue light B2 has a light orientation distribution similar to the light orientation distribution of the fluorescence YL generated in the first light source apparatus 11. The scatter plate 42 is made, for example, of ground glass made of optical glass.

The second pickup system 43 includes a first lens 43a and a second lens 34b and substantially parallelizes the light from the scatter plate 43. The first lens 43a and the second lens 43b are each formed of a convex lens.

In the present embodiment, the blue light B2 from the second light source apparatus 12 is reflected off the dichroic mirror 13 and combined with the fluorescence YL having been outputted from the first light source apparatus 11 and having passed through the dichroic mirror 13 to produce the illumination light WL, which is white light. The illumination light WL enters the homogenizing illuminator 14.

The homogenizing illuminator 14 includes a first lens array 30, a second lens array 31, a polarization converter 32, and a superimposing lens 33.

The first lens array 30 includes a plurality of first lenslets for dividing the light from the dichroic mirror 13 into a plurality of sub-light fluxes. The plurality of first lenslets are arranged in a matrix in a plane perpendicular to the illumination optical axis 100ax.

The second lens array 31 includes a plurality of second lenslets corresponding to the plurality of first lenslets of the first lens array 30. The second lens array 31 forms, along with the superimposing lens 33, images of the first lenslets of the first lens array 30 in the vicinity of an image formation region of each of the light modulators 4R, 4G, and 4B. The plurality of second lenslets are arranged in a matrix in a plane perpendicular to the illumination optical axis 100ax.

The polarization converter 32 aligns the polarization directions of the illumination light WL with one another. The polarization converter 32 includes, for example, polarization separation films, retardation plates, and mirrors. The polarization converter 32 converts one polarized light component into another polarized light component, for example, a P-polarized light component into an S-polarized light component to align the polarization directions of the fluorescence YL, which is non-polarized light, with the polarization direction of the blue light B2.

The superimposing lens 33 collects the sub-light fluxes from the polarization converter 32 and superimposes the collected sub-light fluxes on one another in the vicinity of the image formation region of each of the light modulators 4R, 4G, and 4B. The first lens array 30, the second lens array 31, and the superimposing lens 33 form an optical integration system that homogenizes the in-plane optical intensity distribution of the illumination light WL.

The wavelength converter 23 according to the present embodiment described above provides the following effects: The wavelength converter 23 according to the present embodiment includes the phosphor 35, which converts the excitation light LL in terms of wavelength to generate the fluorescence YL, and the reflection layers 46, which incline with respect to the light exiting surface 35a of the phosphor 35, which is the surface via which the fluorescence YL exits, and reflect the fluorescence YL.

Since the wavelength converter 23 according to the present embodiment includes the reflection layers 46, which incline with respect to the light exiting surface 35a, the first component YL1 having a large exiting angle out of the fluorescence YL having exited via the light exiting surface 35a can be so reflected that the exiting angle of the first component YL1 with respect to the direction H1 of the normal decreases. The decrease in the radiation angle of the fluorescence YL allows reduction in an increase in the etendue, whereby the efficiency at which the fluorescence YL is used can be improved.

Further, in the wavelength converter 23 according to the present embodiment, the reflection layers 46 are provided on the phosphor 35 (convex members 47). The convex members 47 formed of part of the phosphor 35 can thus be used to readily and reliably provide the reflection layers 46.

The wavelength converter 23 according to the present embodiment further includes the microlens 45 (lenslets 45a), which is disposed at the side facing the light exiting surface 35a of the phosphor 35 and changes the traveling direction of at least the fluorescence YL reflected off the reflection layers 46. The resultant further decrease in the radiation angle of the fluorescence YL allows reduction in an increase in the etendue, whereby the efficiency at which the fluorescence YL is used can be further improved.

In the wavelength converter 23 according to the present embodiment, the reflection region 35R, which is formed of the plurality of reflection layers 46, is a latticed region in the plan view along the direction in which the fluorescence YL exits. The reflection region 35R is therefore so provided as to surround the circumferences of the light exiting regions 35S, whereby the radiation angle of the fluorescence YL having exited via each of the light exiting regions 35S has an isotropic circular distribution. The radiation angle of the fluorescence YL having exited via each of the light exiting regions 35S therefore has an isotropic distribution, whereby an increase in the etendue can be more readily reduced.

The first light source apparatus 11 according to the present embodiment described above provides the following effect: The first light source apparatus 11 according to the present embodiment includes the first light source 20, which outputs the excitation light LL, and the wavelength converter 23. The thus configured first light source apparatus 11 according to the present embodiment including the wavelength converter 23, which reduces the etendue with the influence of the optical extinction suppressed, can generate high-luminance fluorescence YL with the size of the first light source apparatus 11 reduced.

The projector 1 according to the present embodiment described above provides the following effect: The projector 1 according to the present embodiment includes the illumination apparatus 2, which includes the first light source apparatus 11, the light modulators 4B, 4G, and 4R, which modulate the blue light LB, the green light LG, and the red light LR from the illumination apparatus 2 in accordance with image information to form image light, and the projection optical apparatus 6, which projects the image light described above. The thus configured projector 1 according to the present embodiment, which includes the first light source apparatus 11, which generates high-luminance fluorescence YL with the size of the first light source apparatus 11 reduced, can form and project a high-luminance image with the size of the projector 1 reduced.

In the present embodiment, the surfaces 47c of the convex members 47, which are the surfaces on which the reflection layers 46 are provided, are each a flat surface. Part of each of the surfaces 47c may instead be a curved surface.

Second Embodiment

A wavelength converter according to a second embodiment will subsequently be described. Configurations and members common to those in the first embodiment have the same reference characters and will not be described in detail.

Figure 5:
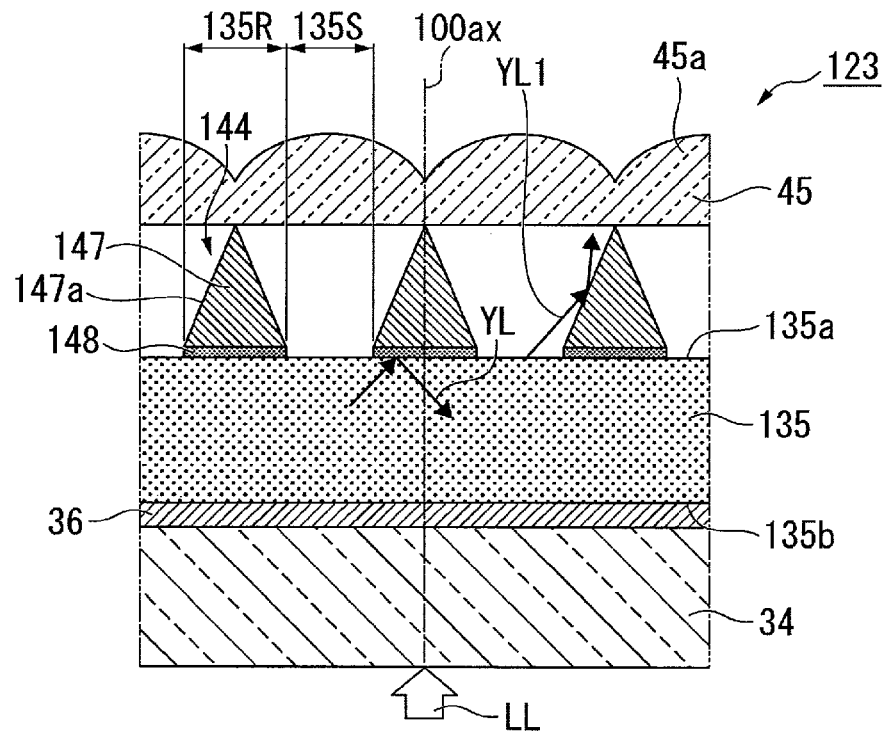
FIG. 5 is a cross-sectional view showing the configuration of a wavelength converter according to a second embodiment.

FIG. 5 is a cross-sectional view showing the configuration of the wavelength converter according to the present embodiment. A wavelength converter 123 includes the base 34, a phosphor 135, the dichroic film 36, a reflection structure 144, and the microlens 45, as shown in FIG. 5.

The phosphor 135 in the present embodiment is made, for example, of a YAG-ceramic-based ceramic phosphor formed of a plurality of burned YAG phosphor particles and has a plate-like shape. The reflection structure 144 is bonded to the upper surface of the phosphor 135 via bonding layers 148. The bonding layers 148 are made of a low-refractive-index material having a refractive index lower than that of the phosphor 135.

In the present embodiment, the reflection structure 144 is formed of convex reflection members (convex members) 147 and provided at a side facing a light exiting surface 135a of the phosphor 135, via which the fluorescence YL exits. The convex reflection members 147 are made of a material different from the material of which the phosphor 135 is made. In the present embodiment, the convex reflection members 147 are made, for example, of a metal material that reflects light, such as Al and Ag. The convex reflection members 147 as a whole have a lattice-like plan shape in the plan view along the direction in which the fluorescence YL exits, as the convex members 47 in the first embodiment do (see FIG. 4).

The convex reflection members 147 each have an inverted-V-letter cross-sectional shape when taken along a plane perpendicular to the light exiting surface 135a. A surface 147a of each of the convex reflection members 147 is an inclining surface that inclines with respect to the light exiting surface 135a of the phosphor 135. The surface 147a of each of the convex reflection members 147 functions as a reflective surface that reflects the fluorescence YL having exited via light exiting regions 135S (light exiting surface 135a). That is, in the present embodiment, the first reflection member, which reflects the fluorescence YL, is provided as part of the convex reflection members 147.

Out of the upper surface of the phosphor 135, the portion where no reflection structure 144 is provided forms the light exiting regions 135S, via which the fluorescence YL exits. In the present embodiment, the light exiting regions 135S correspond to the light exiting surface 135a of the phosphor 135.

On the other hand, the portion where the reflection structure 144 is formed forms a reflection region 135R, which reflects the fluorescence YL having exited via the light exiting surface 135a. In the plan view along the direction in which the fluorescence exits, the reflection region 135R is a latticed region.

The wavelength converter 123 according to the present embodiment allows the surfaces 147a of the convex reflection members 147 to reflect the first component YL1 having a large exiting angle out of the fluorescence YL for a decrease in the exiting angle of the first component YL1. The efficiency at which the fluorescence YL is used can thus be improved with an increase in the etendue reduced. Further, since the wavelength converter 123 according to the present embodiment allows reduction in the etendue with no decrease in the excitation incidence area of the phosphor 135 on which the excitation light LL is incident, the optical extinction due to an increase in optical density of the excitation light LL can be suppressed. The wavelength converter 123 according to the present embodiment is therefore also capable of reducing the etendue with the influence of the optical extinction suppressed.

In the wavelength converter 123 according to the present embodiment, part of the fluorescence YL is incident on the lower surface of the reflection structure 144, that is, the bonding layers 148. Since the bonding layers 148 are made of a low-refractive-index material having a refractive index lower than that of the phosphor 135, the fluorescence YL can be totally reflected off the interface between the bonding layers 148 and the phosphor 135. The totally reflected fluorescence YL returns into the phosphor 135a and eventually exits out of the phosphor 135 via the light exiting regions 135S (light exiting surface 135a).

Consider now as Comparative Example, for example, a case where the reflection structure 144 and the phosphor 135 are in contact with each other with use of no bonding layers 148. In this case, the fluorescence YL incident on the lower surface of the reflection structure 144 is slightly absorbed by the reflection structure 144 when reflected off the reflection structure 144, resulting in optical loss. In contrast, the wavelength converter 123 according to the present embodiment causes the fluorescence YL incident on the lower surface of the reflection structure 144 to be totally reflected off the bonding layers 148 as described above, whereby the light use efficiency can be improved by reduction in the occurrence of the optical loss.

In the wavelength converter 123 according to the present embodiment, the reflection structure 144 (reflection region 135R) is a latticed structure in the plan view along the direction in which the fluorescence YL exits. Since the reflection region 35R is thus so provided as to surround the circumferences of the light exiting regions 135S, the radiation angle of the fluorescence YL having exited via each of the light exiting regions 135S has an isotropic distribution, whereby an increase in the etendue can be more readily reduced.

In the present embodiment, the surfaces 147a of the convex reflection members 147 are each a flat surface. Part of each of the surfaces 147a may instead be a curved surface.

First Variation of Second Embodiment

A wavelength converter according to a first variation of the second embodiment will subsequently be described. Configurations and members common to those in the second embodiment have the same reference characters and will not be described in detail.

Figure 6:
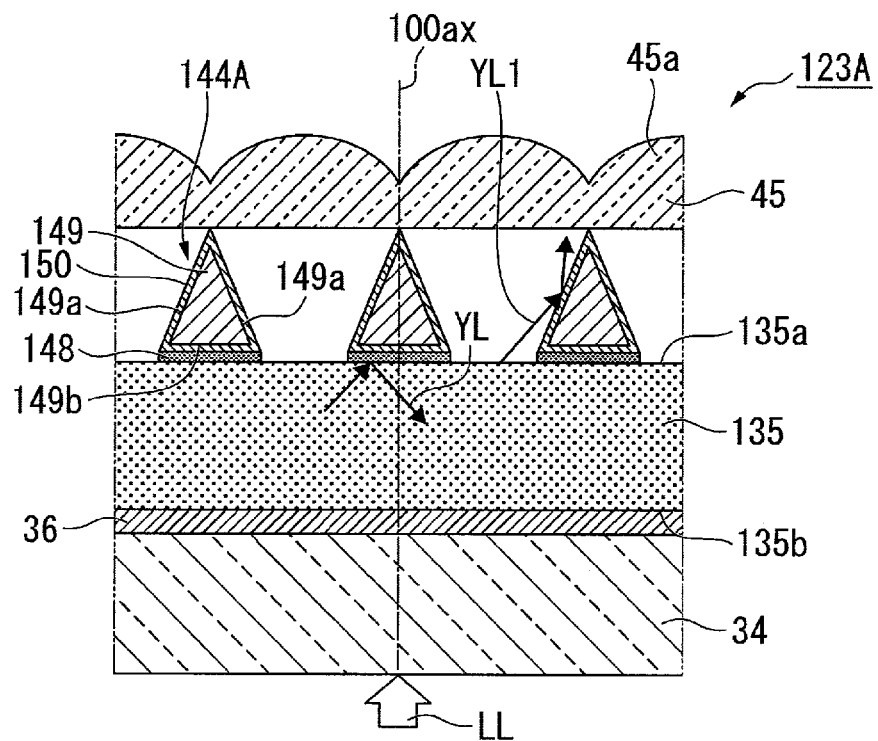
FIG. 6 is a cross-sectional view of a wavelength converter according to a first variation of the second embodiment.

FIG. 6 is a cross-sectional view showing the configuration of the wavelength converter according to the present variation. A wavelength converter 123A includes the base 34, the phosphor 135, the dichroic film 36, a reflection structure 144A, and the microlens 45, as shown in FIG. 6. The reflection structure 144A is bonded to the upper surface of the phosphor 135 via the bonding layers 148.

In the present variation, the reflection structure 144A includes convex members 149 and reflection layers (first reflection member) 150. The convex members 149 are made of a material different from the material of which the phosphor 135 is made. In the present variation, the convex members 149 are not necessarily made of a particular material and are made, for example, of a ceramic, metal, or glass material. The convex members 149 as a whole have a lattice-like plan shape in the plan view along the direction in which the fluorescence YL exits, as the convex members 47 in the first embodiment do (see FIG. 4).

The convex members 149 each have an inverted-V-letter cross-sectional shape when taken along a plane perpendicular to the light exiting surface 135a of the phosphor 135. A surface 149a of each of the convex members 149 is an inclining surface that inclines with respect to the light exiting surface 135a.

A reflection layer 150 is so provided as to cover the entire surface of each of the convex members 149, more specifically, the surface 149a and a lower surface 149b. The reflection layers 150 are each formed of a metal film made, for example, of Ag or Al, or a dielectric multilayer film. In the present variation, since the surfaces 149a incline with respect to the light exiting surface 135a, the reflection layers 150 provided on the surfaces 149a are so provided as to incline with the light exiting surface 135a. The reflection layers 150 therefore function as the first reflection member, which reflects part of the fluorescence YL having exited via the light exiting regions 135S (light exiting surface 135a).

Out of the upper surface of the phosphor 135, the portion where no reflection structure 144A is provided forms the light exiting regions 135S, via which the fluorescence YL directly exits from the phosphor 135. The light exiting regions 135S correspond to the light exiting surface 135a of the phosphor 135.

On the other hand, the portion where the reflection structure 144A is formed forms the reflection region 135R, which reflects the fluorescence YL having exited via the light exiting surface 135a. In the plan view along the direction in which the fluorescence exits, the reflection region 135R is a latticed region.

The wavelength converter 123A according to the present variation allows the reflection layers 150 to reflect the first component YL1 having a large exiting angle out of the fluorescence YL for a decrease in the exiting angle of the first component YL1. The efficiency at which the fluorescence YL is used can thus be improved with an increase in the etendue reduced. Further, since the wavelength converter 123A according to the present variation allows reduction in the etendue with no decrease in the excitation light incidence area of the phosphor 135 on which the excitation light LL is incident, the optical extinction due to an increase in optical density of the excitation light LL can be suppressed. The wavelength converter 123A according to the present variation is therefore also capable of reducing the etendue with the influence of the optical extinction suppressed.

Further, the wavelength converter 123A according to the present variation also causes the fluorescence YL incident on the lower surface of the reflection structure 144A to be totally reflected off the bonding layers 148, whereby the light use efficiency can be improved.

Also in the wavelength converter 123A according to the present variation, since the reflection structure 144A (reflection region 135R) is a latticed structure in the plan view along the direction in which the fluorescence YL exits, the radiation angle of the fluorescence YL having exited via each of the light exiting regions 135S has an isotropic distribution, whereby an increase in the etendue can be more readily reduced.

In the present variation, the surfaces 149a of the convex members 149, which are the surfaces on which the reflection layers 150 are formed, are each a flat surface. Part of each of the surfaces 149a may instead be a curved surface.

Second Variation of Second Embodiment

A wavelength converter according to a second variation of the second embodiment will subsequently be described. Configurations and members common to those in the second embodiment have the same reference characters and will not be described in detail.

Figure 7:
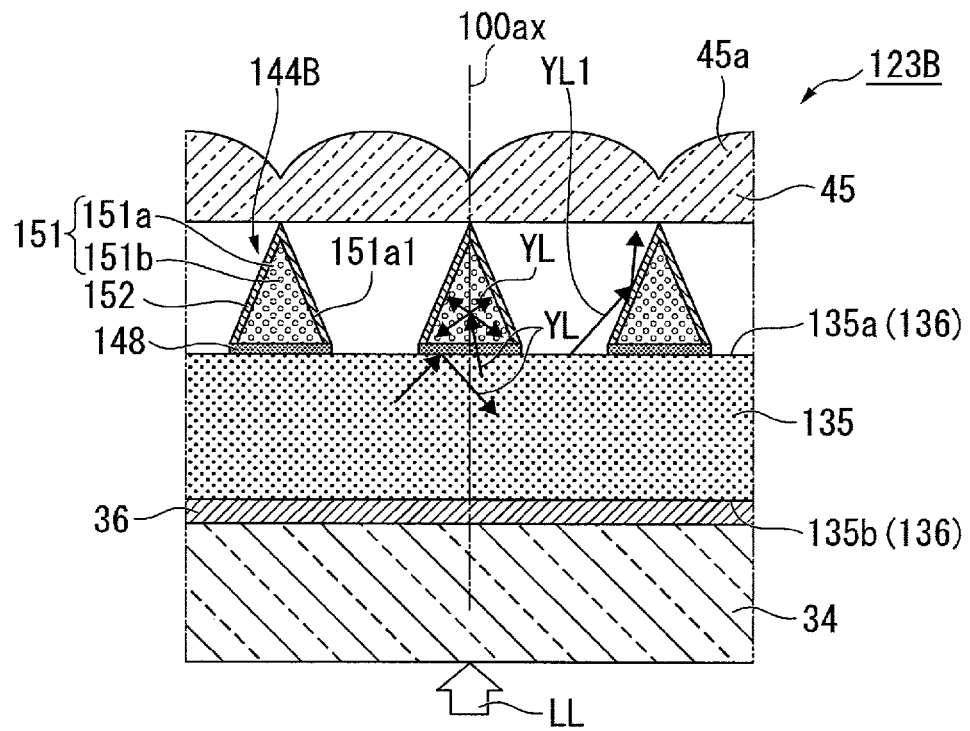
FIG. 7 is a cross-sectional view of a wavelength converter according to a second variation of the second embodiment.

FIG. 7 is a cross-sectional view showing the configuration of the wavelength converter according to the present variation. A wavelength converter 123B includes the base 34, the phosphor 135, the dichroic film 36, a reflection structure 144B, and the microlens 45, as shown in FIG. 7. The reflection structure 144B is bonded to the upper surface of the phosphor 135 via the bonding layers 148.

Out of the upper surface of the phosphor 135, the portion where no reflection structure 144B is provided forms the light exiting regions 135S, via which the fluorescence YL directly exits from the phosphor 135. The light exiting regions 135S correspond to the light exiting surface 135a of the phosphor 135.

On the other hand, the portion where the reflection structure 144B is formed forms the reflection region 135R, which reflects the fluorescence YL having exited via the light exiting surface 135a. In the plan view along the direction in which the fluorescence exits, the reflection structure 144B is a latticed structure.

In the present variation, the reflection structure 144B includes convex members 151 and reflection layers (first reflection member) 152. The convex members 151 are made of a material different from the material of which the phosphor 135 is made. In the present variation, the convex members 151 are made of a material different from the material of which the phosphor 135 is made.

The convex members 151 each include a base body 151a, which is made of a light transmissive material, and scatterers 151b, which are contained in the base body 151a and have a refractive index different from that of the base body 151a. The base bodies 151a are preferably made of a material having a refractive index close to that of the phosphor 135. The scatterers 151b are each formed, for example, of an air-containing cavity. The convex members 151 as a whole have a lattice-like plan shape in the plan view along the direction in which the fluorescence YL exits, as the convex members 47 in the first embodiment do (see FIG. 4).

The convex members 151 each have an inverted-V-letter cross-sectional shape when taken along a plane perpendicular to the light exiting surface 135a of the phosphor 135. A surface 151a1 of each of the convex members 151 is an inclining surface that inclines with respect to the light exiting surface 135a.

A reflection layer 152 is so provided as to cover the surface 151a1 of each of the convex members 151. The reflection layers 152 are each formed of a metal film made, for example, of Ag or Al, or a dielectric multilayer film. In the present variation, since the surfaces 151a1 incline with respect to the light exiting surface 135a, the reflection layers 152 provided on the surfaces 151a1 incline with the light exiting surface 135a. The reflection layers 152 therefore reflect the fluorescence YL having exited via the light exiting regions 135S (light exiting surface 135a).

The wavelength converter 123B according to the present variation allows the reflection layers 152 to reflect the first component YL1 having a large exiting angle out of the fluorescence YL for a decrease in the exiting angle of the first component YL1. The efficiency at which the fluorescence YL is used can thus be improved with an increase in the etendue reduced. Further, since the wavelength converter 123B according to the present variation allows reduction in the etendue with no decrease in the excitation light incidence area of the phosphor 135 on which the excitation light LL is incident, the optical extinction due to an increase in optical density of the excitation light LL can be suppressed. The wavelength converter 123B according to the present variation is therefore also capable of reducing the etendue with the influence of the optical extinction suppressed.

Further, the wavelength converter 123B according to the present variation also causes the fluorescence YL incident on the lower surface of the reflection structure 144B to be totally reflected off the bonding layers 148, whereby the light use efficiency can be improved.

In the present variation, out of the fluorescence YL, components that enter the bonding layers 148 at angles of incidence smaller than the critical angle can pass through the bonding layers 148 and enter the convex members 151.

Consider now as Comparative Example a case where the base bodies 151a, which form the convex members 151, contain no scatterer 151b. In this case, the fluorescence YL having entered the convex members 151 passes through the base bodies 151a and is reflected off the reflection layers 152 provided on the surfaces 151a1 of the convex members 151. The fluorescence YL having entered the convex members 151 is therefore absorbed and partially lost when reflected off the reflection layers 152, resulting in optical loss although the amount of loss is small.

In contrast, according to the present variation, the fluorescence YL having entered the convex members 151 is scattered by the scatterers 151b contained in the base bodies 151a and returns into the phosphor 135 again without part of the components of the fluorescence YL incident on the reflection layers 152. The configuration of the present variation therefore allows suppression of occurrence of loss of the fluorescence YL absorbed by the reflection layers 152 to further improve the light use efficiency.

Further, also in the wavelength converter 123B according to the present variation, since the reflection structure 144B (reflection region 135R) is a latticed structure in the plan view along the direction in which the fluorescence YL exits, the radiation angle of the fluorescence YL having exited via each of the light exiting regions 135S has an isotropic distribution, whereby an increase in the etendue can be more readily reduced.

In the present variation, the surfaces 151a1 of the convex members 151, which are the surfaces on which the reflection layers 152 are formed, are each a flat surface. Part of each of the surfaces 151a1 may instead be a curved surface.

Third Embodiment

A wavelength converter according to a third embodiment will subsequently be described. Configurations and members common to those in the embodiments described above have the same reference characters and will not be described in detail.

Figure 8:
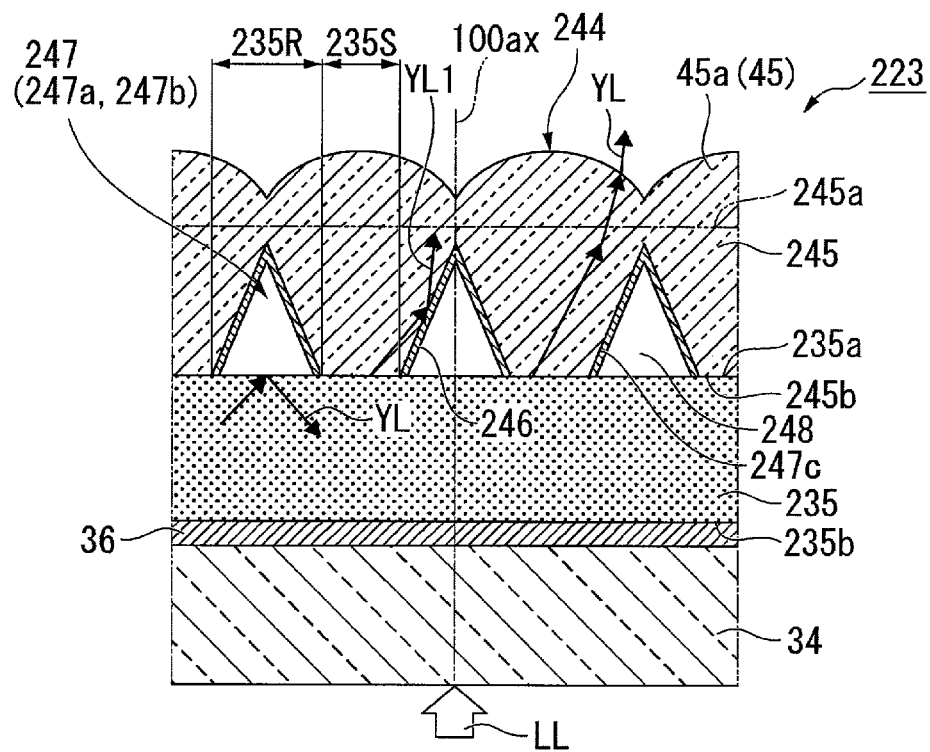
FIG. 8 is a cross-sectional view showing the configuration of a wavelength converter according to a third embodiment.

FIG. 8 is a cross-sectional view showing the configuration of the wavelength converter according to the present embodiment. A wavelength converter 223 includes the base 34, a phosphor 235, the dichroic film 36, a reflection structure 244, and the microlens 45, as shown in FIG. 8.

The phosphor 235 in the present embodiment is made, for example, of a YAG-ceramic-based ceramic phosphor formed of a plurality of burned YAG phosphor particles and has a plate-like shape. The reflection structure 244 is provided on the upper surface of the phosphor 235.

In the present embodiment, the reflection structure 244 includes a translucent member 245 and reflection layers (first reflection member) 246. The translucent member 245 transmits the fluorescence YL and is provided on the light exiting surface of the phosphor 135. Specifically, the translucent member 245 is made of a light transmissive glass or resin material or a translucent ceramic material. The translucent member 245 has recesses 247 provided in a lower surface 245b.

Figure 9:
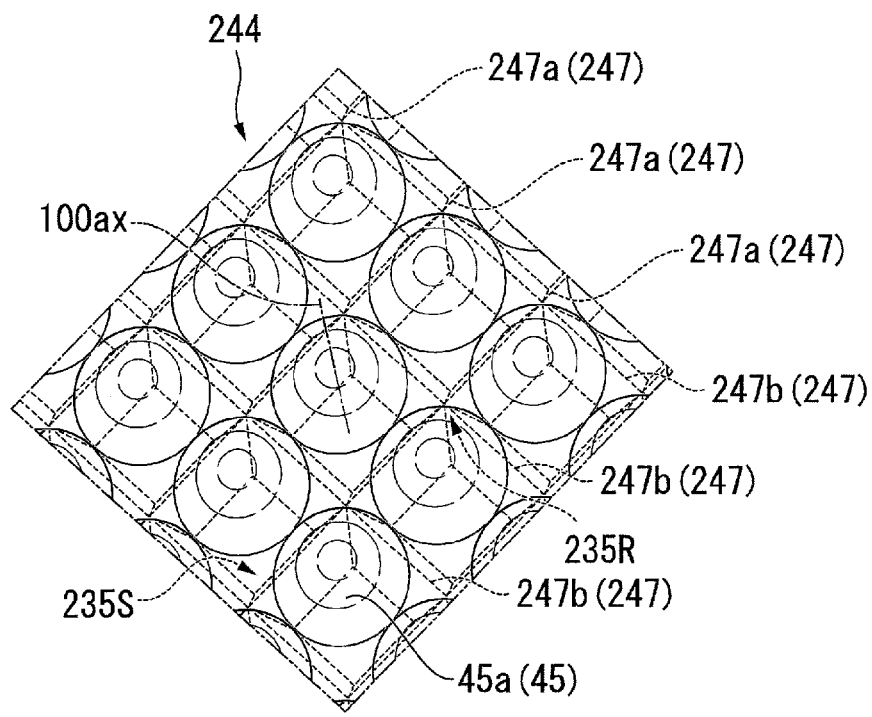
FIG. 9 is an enlarged view showing the configuration of key parts of the wavelength converter according to the third embodiment.

FIG. 9 is an enlarged view showing the configuration of key parts of the wavelength converter. The recesses 247 include a plurality of first recesses 247a arranged in the lower surface 245b along the first direction and a plurality of second recesses 247b arranged in the lower surface 245b along the second direction perpendicular to the first direction.

The first recesses 247a and the second recesses 247b are so formed in the lower surface 245b as to intersect each other. The recesses 247 as a whole have a lattice shape in the plan view along the direction in which the fluorescence YL exits. The first recesses 247a each have an inverted-V-letter cross-sectional shape when taken along a plane perpendicular to the direction in which the first recesses 247a extend. Similarly, the second recesses 247b each have an inverted-V-letter cross-sectional shape when taken along a plane perpendicular to the direction in which the second recesses 247b extend.

In the state in which the translucent member 245 is disposed on the phosphor 235, the surface of each of the first recesses 247a and the second recesses 247b is an inclining surface that inclines with respect to a light exiting surface 235a of the phosphor 235, which is a surface via which the fluorescence YL exits. The surfaces (inclining surfaces) of the first recesses 247a and the second recesses 247b are hereinafter collectively referred to as inclining surfaces 247c of the translucent member 245. In the state in which the translucent member 245 is disposed on the phosphor 235, air layers 248 are provided in the spaces formed by the recesses 247 and the phosphor 235.

In the present embodiment, the reflection layers 246 are provided on the inclining surfaces 247c of the translucent member 245. The reflection layers 246 are each formed of a metal film made, for example, of Ag or Al, or a dielectric multilayer film and reflect the fluorescence YL having exited via light exiting regions 235S (light exiting surface 235a), which will be described later. In the present embodiment, since the inclining surfaces 247c incline with respect to the light exiting surface 235a, the reflection layers 246 provided on the inclining surfaces 247c incline with respect to the light exiting surface 235a.

In the present embodiment, out of the upper surface of the phosphor 235, the portion that does not overlap with the recesses 247 of the reflection structure 244 in the plan view forms the light exiting regions 235S, via which the fluorescence YL directly exits from the phosphor 235. In the present embodiment, the light exiting regions 235S correspond to the light exiting surface 235a of the phosphor 235.

On the other hand, the portion where the reflection structure 244 is formed forms a reflection region 235R, which reflects the fluorescence YL having exited via the light exiting surface 235a. In the plan view along the direction in which the fluorescence YL exits, the reflection region 235R is a latticed region, as shown in FIG. 9. That is, the light exiting regions 235S (light exiting surface 235a) are provided in regions defined by the reflection region 235R. The reflection region 235R is therefore so provided as to surround the circumferences of the light exiting regions 235S.

In the present embodiment, the microlens 45 is provided at the light exiting side of the reflection structure 244. Specifically, the microlens 45 is attached to an upper surface 245a of the translucent member 245. The microlens 45 includes a plurality of lenslets 45a and is so provided on the upper surface 245a of the translucent member 245 that the lenslets 45a are located immediately above the light exiting regions 235S.

The effect of the wavelength converter 223 according to the present embodiment will subsequently be described. The fluorescence YL having exited via the light exiting regions 235S (light exiting surface 235a) enters the reflection structure 244 via the lower surface 245b of the translucent member 245, as shown in FIG. 8. Part of the fluorescence YL passes through the translucent member 245 and the microlens 45 and enters the pickup system 27. The fluorescence YL exits via the light exiting surface 235a in the form of Lambert radiation and therefore contains the first component YL1 having a large exiting angle with respect to the light exiting surface 235a. The reflection layers 246 on the reflection region 235R of the reflection structure 244 reflect the first component YL1.

The wavelength converter 223 according to the present embodiment allows the reflection layers 246 to reflect the first component YL1 having a large exiting angle out of the fluorescence YL for a decrease in the exiting angle of the first component YL1. The efficiency at which the fluorescence YL is used can thus be improved with an increase in the etendue reduced. Further, since the wavelength converter 223 according to the present embodiment allows reduction in the etendue with no decrease in the excitation light incidence area of the phosphor 235 on which the excitation light LL is incident, the optical extinction due to an increase in optical density of the excitation light LL can be suppressed. The wavelength converter 223 according to the present embodiment is therefore also capable of reducing the etendue with the influence of the optical extinction suppressed.

In the wavelength converter 223 according to the present embodiment, the fluorescence YL having exited via a surface different from the light exiting surface 235a undesirably enters the recesses 247 of the reflection structure 244. Since the air layers 248, the refractive index of which is smaller than that of the phosphor 235, are provided in the spaces formed by the recesses 247 and the phosphor 235, the fluorescence YL can be totally reflected off the interface between the air layers 248 and the phosphor 235. The totally reflected fluorescence YL returns into the phosphor 235 and exits again out of the phosphor 235 via the light exiting regions 235S (exiting surface 235a). The wavelength converter 223 according to the present embodiment causes total reflection of the fluorescence YL incident on the lower surface of the reflection structure 244 as described above, whereby the light use efficiency can be improved by reduction in the occurrence of the optical loss.

In the wavelength converter 223 according to the present embodiment, the reflection region 235R is a latticed region in the plan view along the direction in which the fluorescence YL exits. Since the reflection region 235R is thus so provided as to surround the circumferences of the light exiting regions 235S, the radiation angle of the fluorescence YL having exited via each of the light exiting regions 235S has an isotropic distribution, whereby an increase in the etendue can be more readily reduced.

In the present embodiment, the inclining surfaces 247c of the translucent member 245, which are the surfaces on which the reflection layers 246 are formed, are each a flat surface. Part of each of the inclining surfaces 247c may instead be a curved surface.

Fourth Embodiment

A wavelength converter according to a fourth embodiment will subsequently be described. Configurations and members common to those in the third embodiment have the same reference characters and will not be described in detail.

Figure 10:
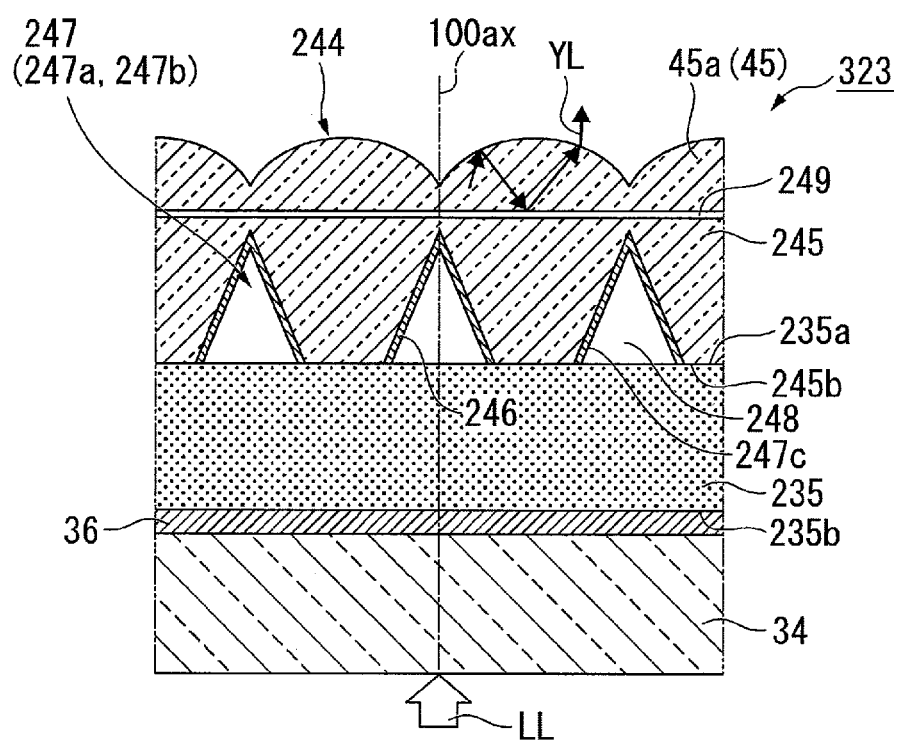
FIG. 10 is a cross-sectional view showing the configuration of a wavelength converter according to a fourth embodiment.

FIG. 10 is a cross-sectional view showing the configuration of the wavelength converter according to the present embodiment. A wavelength converter 323 includes the base 34, the phosphor 235, the dichroic film 36, the reflection structure 244, a bonding layer (low-refractive-index layer) 249, and the microlens 45, as shown in FIG. 10.

In the present embodiment, the microlens 45 is so disposed as to face the translucent member 245. Specifically, the microlens 45 is attached to the upper surface 245a of the reflection structure 244 via the bonding layer 249. The bonding layer 249 is made of a low-refractive-index material having a refractive index lower than that of the microlens 45. The microlens 45 includes a plurality of lenslets 45a and is so attached to the upper surface 245a of the translucent member 245 that the lenslets 45a are located immediately above the light exiting regions 235S. That is, in the present embodiment, the microlens 45 is not provided integrally with the translucent member 245.

The wavelength converter 323 according to the present embodiment can provide the same effects provided by the wavelength converter 223 according to the third embodiment. Further, the wavelength converter 323 according to the present embodiment, in which the microlens 45 is not integrated with the translucent member 245, can provide the following effect.

Consider now as Comparative Example a case where the microlens 45 is integrated with the translucent member 245, that is, a case where the wavelength converter 223 according to the third embodiment is employed. Part of the fluorescence YL having entered the microlens 45 is totally reflected by the surfaces of the microlens 45 and therefore does not exit out of the microlens 45 but returns toward the translucent member 245. In the case where the microlens 45 is integrated with the translucent member 245, the fluorescence YL totally reflected off the surfaces of the lenslets 45a travels into the translucent member 245 and is reflected off the reflection layers 246. The fluorescence YL totally reflected off the lenslets 45a is therefore absorbed and partially lost when reflected off the reflection layers 246, resulting in optical loss although the amount of loss is small. Further, the fluorescence YL totally reflected off the lenslets 45a enters the phosphor 235 via the light exiting surface 235a and is absorbed by the phosphor 235, resulting in optical loss.

In contrast, in the wavelength converter 323 according to the present embodiment, the fluorescence YL totally reflected off the lenslets 45a is totally reflected off the bonding layer 249, which is provided between the microlens 45 and the translucent member 245 and the refractive index of which is smaller than that of the phosphor 235, and exits out of the lenslets 45a. The configuration of the present embodiment therefore allows reduction in the optical loss of the fluorescence YL totally reflected off the lenslets 45a, whereby the light use efficiency can be further improved.

In the present embodiment, the inclining surfaces 247c of the translucent member 245, which are the surfaces on which the reflection layers 246 are formed, are each a flat surface. Part of each of the inclining surfaces 247c may instead be a curved surface.

Fifth Embodiment

A wavelength converter according to a fifth embodiment will subsequently be described. Configurations and members common to those in the embodiments and variations described above have the same reference characters and will not be described in detail.

Figure 11:
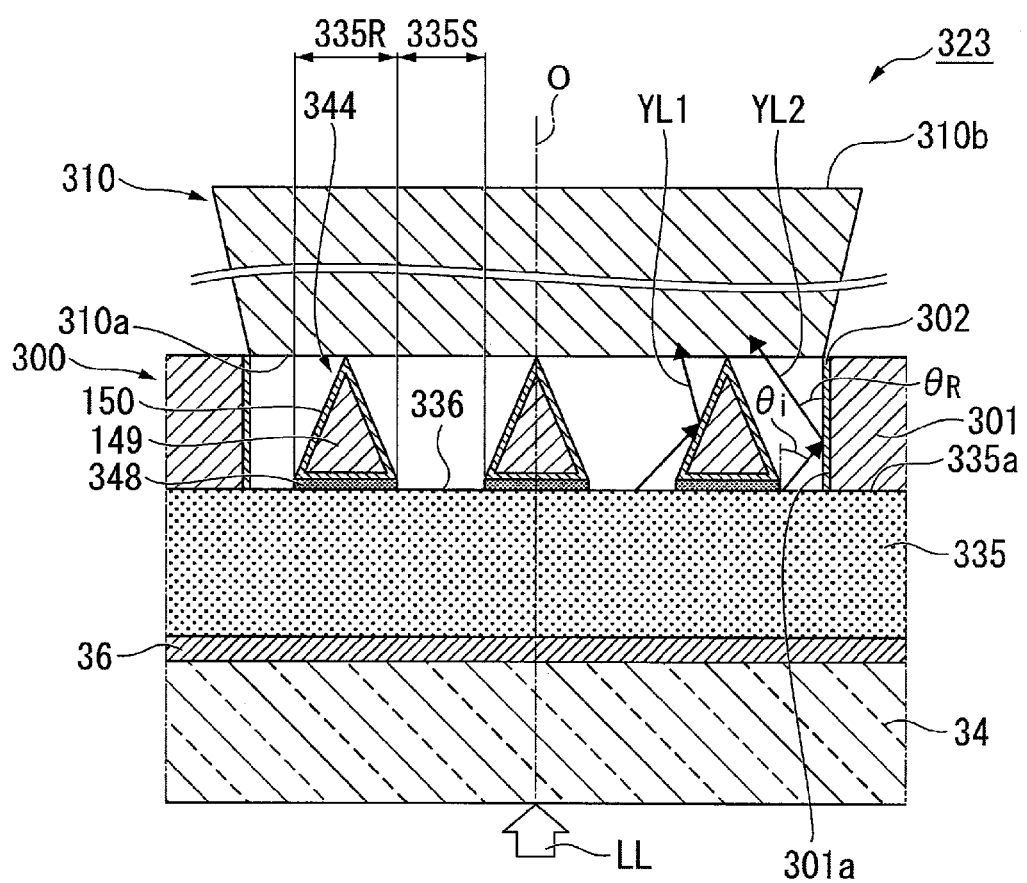
FIG. 11 is a cross-sectional view showing the configuration of a wavelength converter according to a fifth embodiment.

FIG. 11 is a cross-sectional view showing the configuration of the wavelength converter according to the present embodiment. A wavelength converter 323 includes the base 34, a phosphor 335, the dichroic film 36, a reflection structure 344, a side structure 300, and a light guide 310, as shown in FIG. 11.

The phosphor 335 in the present embodiment is made, for example, of a YAG-ceramic-based ceramic phosphor formed of a plurality of burned YAG phosphor particles and has a plate-like shape. The reflection structure 344 and the side structure 300 are provided on an upper surface 335a of the phosphor 335. The reflection structure 344 in the present embodiment has the same configuration as that of the reflection structure 144A shown in FIG. 6. That is, the reflection structure 344 is formed of the convex members 149 and the reflection layers 150. The reflection structure 344 is bonded to the upper surface 335a of the phosphor 335 via bonding layers 348. The bonding layers 348 are made of a low-refractive-index material having a refractive index lower than that of the phosphor 335.

The side structure 300 is so provided on the upper surface 335a of the phosphor 335 as to form a frame that surrounds the circumference of the reflection structure 344. The side structure 300 includes a frame section 301, which surrounds the circumference of the reflection structure 344, and a reflection layer (second reflection member) 302, which is provided on an inner wall surface 301a of the frame section 301. The frame section 301 is as tall as the reflection structure 344. The frame section 301 is not necessarily made of a particular material and is made, for example, of a ceramic, metal, or glass material. The reflection layer 302 is formed of a metal film made, for example, of Ag or Al, or a dielectric multilayer film. The thus configured side structure 300 allows the fluorescence YL reflected off the reflection layer 302 to enter the light guide 310.

The light guide 310 guides the fluorescence YL emitted from the phosphor 335 to homogenize the illuminance distribution of the fluorescence YL. The light guide 310 is formed of a translucent member made, for example, of optical glass, including borosilicate glass, such as BK7, quartz glass, and synthetic quartz glass, crystal quartz, and sapphire. The light guide 310 extends in a center axis O. The center axis O coincides with the illumination optical axis 100ax.

The light guide 310 in the present embodiment has a tapered rod shape having a light incident surface 310a and a light exiting surface 310b and having a cross-sectional area that is perpendicular to the center axis O and increases in the direction from the light incident surface 310a toward the light exiting surface 310b. A cross section of the light guide 310 that is a cross section perpendicular to the center axis O may have a circular or quadrangular shape.

In the direction along the center axis O, the light incident surface 310a of the light guide 310 is so disposed as to be flush with an upper surface of the frame section 301. The size of the light incident surface 310a is substantially equal to the size of the opening formed by the inner wall surface 301a of the frame section 301.

Out of the upper surface 335a of the phosphor 335, the portion which is in the region surrounded by the frame section 301 and where no reflection structure 344 is provided forms light exiting regions 335S, via which the fluorescence YL exits. The light exiting regions 335S correspond to a light exiting surface 336 of the phosphor 235.

On the other hand, the portion where the reflection structure 344 is formed forms a reflection region 335R, which reflects the fluorescence YL having exited via the light exiting surface 336. In the plan view along the direction in which the fluorescence YL exits, the reflection region 335R is a latticed region.

The wavelength converter 323 according to the present embodiment allows the reflection region 335R to reflect the first component YL1 having a large exiting angle out of the fluorescence YL for a decrease in the exiting angle of the first component YL1. The efficiency at which the fluorescence YL is used can thus be improved with an increase in the etendue reduced. Further, since the wavelength converter 323 according to the present embodiment allows reduction in the etendue with no decrease in the excitation light incidence area of the phosphor 335 on which the excitation light LL is incident, the optical extinction due to an increase in optical density of the excitation light LL can be suppressed. The wavelength converter 323 according to the present embodiment therefore also allows reduction in the etendue with the influence of the optical extinction suppressed.

Further, the wavelength converter 323 according to the present embodiment includes the side structure 300, which surrounds the circumference of the reflection structure 344. Consider now a case where no side structure 300 is provided. In this case, for example, a second component YL2 of the fluorescence YL having exited via the light exiting regions 335S located in an outer edge portion of the upper surface 335a of the phosphor 335 may not enter the light guide 310, undesirably resulting in optical loss. In contrast, the wavelength converter 323 according to the present embodiment, which includes the side structure 300, allows the second component YL2 of the fluorescence YL having exited via the light exiting regions 335S located in the outer edge portion of the upper surface 335a of the phosphor 335 to be reflected off the side structure 300 and incident on the light incident surface 310a of the light guide 310. The fluorescence YL can thus efficiently enter the light guide 310.

In the present embodiment, the reflection structure having the same configuration as that of the reflection structure 144B shown in FIG. 7 is presented as the reflection structure 344 by way of example. The reflection structure 344 may instead be any of the reflection structures 44, 144, 144A, and 244 described above.

Further, the above embodiment has been described with reference to the case where the side structure 300 is disposed on the upper surface 335a of the phosphor 335, and the side structure 300 may instead be so disposed as to surround a side surface 335b of the phosphor 335. The configuration in which side structure 300 is so disposed as to surround the side surface 335b of the phosphor 335 allows a decrease in the area of the upper surface 335a of the phosphor 335, whereby the size of the phosphor 335 can be reduced and the cost thereof can therefore be lowered.

In the present embodiment, the surfaces of the convex members 149, which are the surfaces on which the reflection layers 150 are formed, (surface of reflection structure 344) may instead each be a curved surface.

Sixth Embodiment

A wavelength converter according to a sixth embodiment will subsequently be described. Configurations and members common to those in the fifth embodiment have the same reference characters and will not be described in detail.

Figure 12:
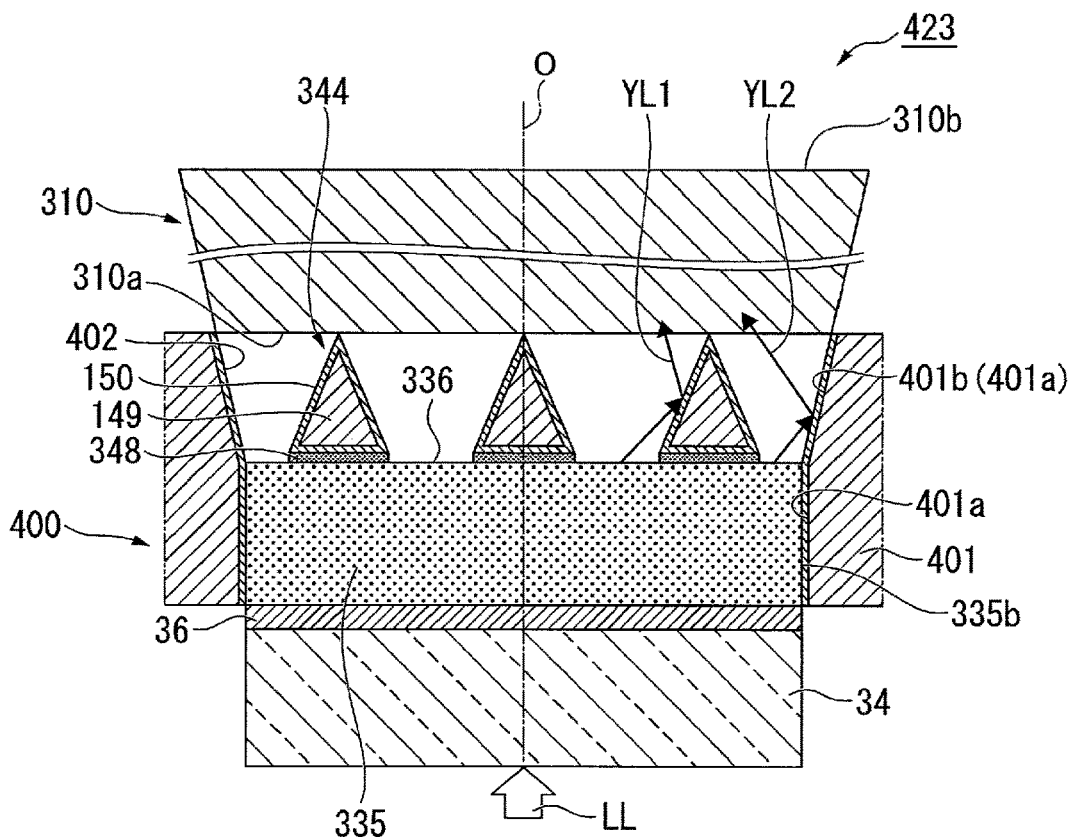
FIG. 12 is a cross-sectional view showing the configuration of a wavelength converter according to a sixth embodiment.

FIG. 12 is a cross-sectional view showing the configuration of the wavelength converter according to the present embodiment. A wavelength converter 423 includes the base 34, the phosphor 335, the dichroic film 36, the reflection structure 344, a side structure 400, and the light guide 310, as shown in FIG. 12.

In the present embodiment, the side structure 400 is so provided at the side surface 335b of the phosphor 335 as to form a frame that surrounds the circumference of the phosphor 335. The side structure 400 includes a frame section 401, which surrounds the phosphor 335 and the reflection structure 344 provided on the phosphor 335, and a reflection layer (second reflection member) 402, which is provided on an inner wall surface 401a of the frame section 401. The frame section 401 is as tall as the combination of the phosphor 335 and the reflection structure 344. The frame section 401 is not necessarily made of a particular material and is made, for example, of a ceramic, metal, or glass material. The reflection layer 402 is formed of a metal film made, for example, of Ag or Al, or a dielectric multilayer film. The thus configured side structure 400 allows the fluorescence YL reflected off the reflection layer 402 to enter the light guide 310.

According to the side structure 400 in the present embodiment, a portion of the inner wall surface 401a that is the portion facing the reflection structure 344 is an inclining surface 401b. The inclining surface 401b inclines in such a way that the amount by which the inclining surface 401b separates away from the center axis O of the light guide 310 increases with distance from the light exiting surface 336 of the phosphor 335 in the direction of the center axis O. In the present embodiment, the reflection layer 402 provided on the inclining surface 401b inclines in such a way that the amount by which the reflection layer 402 separates away from the center axis O of the light guide 310 increases with distance from the light exiting surface 336 of the phosphor 335 in the direction of the center axis O.

In the present embodiment, the reflection layer 402 provided on the inclining surface 401b inclines with respect to the light exiting surface 336. The inclination angle of the inclining surface 401b with respect to the light exiting surface 336 is equal to the inclination angle of the reflection structure 344 with respect to the light exiting surface 336.

The wavelength converter 423 according to the present embodiment can provide the same effects provided by the wavelength converter 323 according to the fifth embodiment. Further, the wavelength converter 423 according to the present embodiment, in which the inner wall surface 401a in the region of the side structure 400 is the inclining surface 401b, allows a decrease in the exiting angle of the second component YL2 of the fluorescence YL reflected off the side structure 400, as compared with the side structure 300 in the fifth embodiment, which has the inner wall surface 301a extending in the direction perpendicular to the light exiting surface 336. The configuration described above allows the fluorescence YL to efficiently enter the light guide 310 and the fluorescence YL so controlled as to have a small radiation angle to enter the light guide 310.

In the present embodiment, the reflection structure having the same configuration as that of the reflection structure 144B shown in FIG. 7 is presented as the reflection structure 344 byway of example. The reflection structure 344 may instead be any of the reflection structures 44, 144, 144A, and 244 described above.

Seventh Embodiment

A wavelength converter according to a seventh embodiment will subsequently be described. Configurations and members common to those in the embodiments and variations described above have the same reference characters and will not be described in detail.

Figure 13:
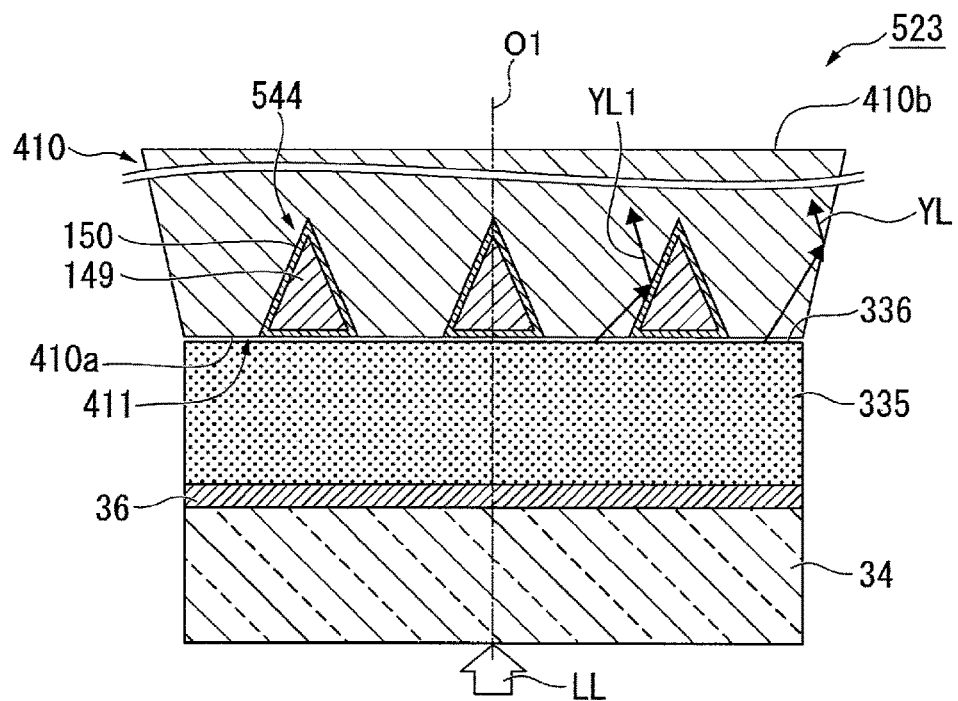
FIG. 13 is a cross-sectional view showing the configuration of a wavelength converter according to a seventh embodiment.

FIG. 13 is a cross-sectional view showing the configuration of the wavelength converter according to the present embodiment. A wavelength converter 523 includes the base 34, the phosphor 335, the dichroic film 36, a light guide 410, and a reflection structure 544, as shown in FIG. 13.

The light guide 410 guides the fluorescence YL emitted from the phosphor 335 to the pickup system 27 shown in FIG. 2. The light guide 410 is formed of a translucent member made, for example, of optical glass, including borosilicate glass, such as BK7, quartz glass, and synthetic quartz glass, crystal quartz, and sapphire. The light guide 410 extends in a center axis O1. The light guide 410 in the present embodiment has a tapered rod shape having a light incident surface 410a and a light exiting surface 410b and having a cross-sectional area that is perpendicular to the center axis O1 and increases in the direction from the light incident surface 410a toward the light exiting surface 410b. A cross section of the light guide 410 that is a cross section perpendicular to the center axis O1 may have a circular or quadrangular shape.

The light guide 410 includes a light incident section 411. The light incident section 411 has the light incident surface 410a, via which the fluorescence YL having exited via the upper surface 335a of the phosphor 335 enters the light guide 410. Out of a surface of the light incident section 411 of the light guide 410 that is the surface facing the phosphor 335, the portion where no reflection structure 544 is provided forms the light incident surface 410a described above.

The light guide 410 is so disposed as to be in contact with or in the vicinity of the phosphor 335. The distance between the light guide 410 and the phosphor 335 is therefore smaller than that in the configurations of the wavelength converters 323 and 423.

In the wavelength converter 523 according to the present embodiment, the reflection structure 544 is buried in the light incident section 411 of the light guide 410. The reflection structure 544 has the same configuration as that of the reflection structure 144A shown in FIG. 6. The reflection structure 544 is therefore formed of the convex members 149 and the reflection layers 150.

In the wavelength converter 523 according to the present embodiment, the fluorescence YL emitted from the phosphor 355 enters the light guide 410 via the light incident surface 410a. The fluorescence YL having entered the light guide 410 propagates while undergoing total reflection in the light guide 410 and exits via the light exiting surface 410b.

The fluorescence YL exits via the light exiting surface 336 in the form of Lambert radiation and therefore contains the first component YL1 having a large exiting angle with respect to the light exiting surface 336, as described above. In the wavelength converter 523 according to the present embodiment, the first component YL1 of the fluorescence YL having entered the light guide 410 via the light incident surface 410a is reflected off the reflection structure 544 buried in the light incident section 411 of the light guide 410, whereby the exiting angle decreases. The wavelength converter 523 according to the present embodiment therefore allows reduction in the radiation angle of the fluorescence YL, as in the other embodiments described above. The efficiency at which the fluorescence YL is used can therefore be improved with an increase in the etendue reduced.

In the wavelength converter 523 according to the present embodiment, the distance between the light guide 410 and the phosphor 335 is small, whereby the fluorescence YL emitted from the phosphor 335 can be taken into the light guide 410 before the fluorescence YL spreads to a wide area. The apparent area from which the fluorescence YL is emitted therefore decreases, whereby the etendue can be reduced.

In the present embodiment, the reflection structure having the same configuration as that of the reflection structure 144A shown in FIG. 6 is presented as the reflection structure 544 byway of example. The reflection structure 544 may instead be the reflection structure 144 described above.

Eighth Embodiment

A wavelength converter according to an eighth embodiment will subsequently be described. Configurations and members common to those in the embodiments and variations described above have the same reference characters and will not be described in detail.

Figure 14:
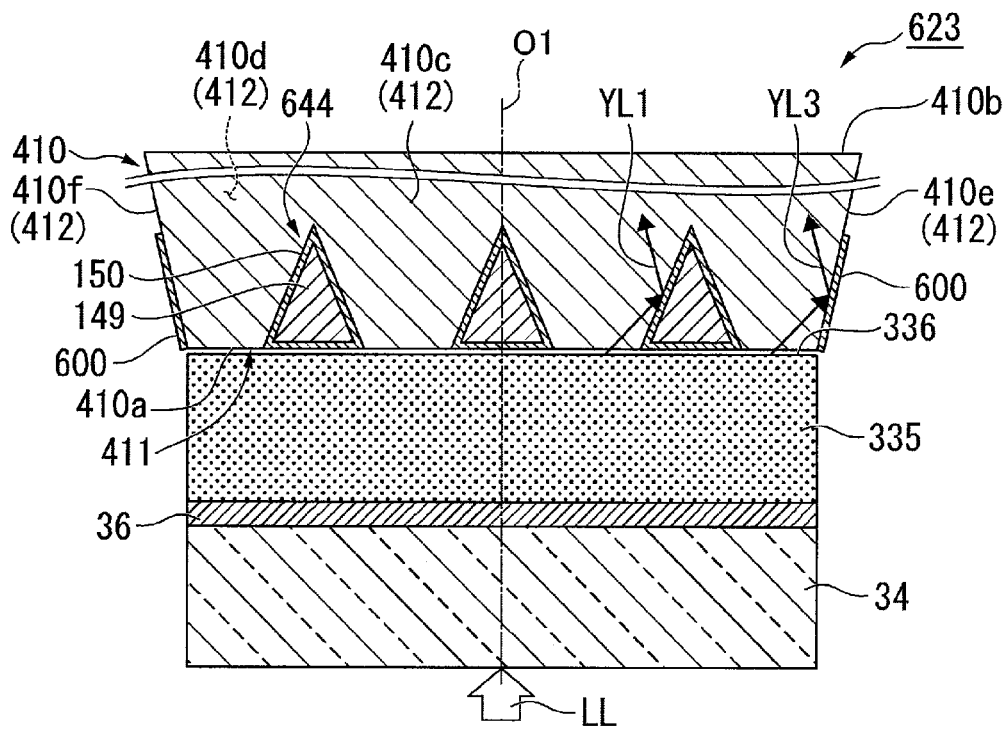
FIG. 14 is a cross-sectional view showing the configuration of a wavelength converter according to an eighth embodiment.

FIG. 14 is a cross-sectional view showing the configuration of the wavelength converter according to the present embodiment. A wavelength converter 623 includes the base 34, the phosphor 335, the dichroic film 36, the light guide 410, a reflection structure 644, and a reflection layer (third reflection member) 600, as shown in FIG. 14.

The light guide 410 in the present embodiment has a first side surface 410c, a second side surface 410d, a third side surface 410e, and a fourth side surface 410f, which couple the light incident surface 410a to the light exiting surface 410b. The first side surface 410c, the second side surface 410d, the third side surface 410e, and the fourth side surface 410f are hereinafter collectively and simply referred to as side surfaces 412.

In the present embodiment, the reflection layer 600 is provided at a portion of the side surfaces 412 that is the portion close to the light incident surface 410a. The reflection layer 600 is formed of a metal film made, for example, of Ag or Al, or a dielectric multilayer film.

The wavelength converter 623 according to the present embodiment can provide the same effects provided by the wavelength converter 523 according to the seventh embodiment.

For example, out of the fluorescence YL having exited via the light exiting regions 335S located in the outer edge portion of the upper surface 335a of the phosphor 335, a third component YL3 having a large radiation angle could be incident on the side surfaces 412 of the light guide 410 at an angle of incidence smaller than the critical angle. In a case where no reflection layer 600 is provided on the side surfaces 412, the third component YL3 passes through the side surfaces 412 of the light guide 410 and exits out of the light guide 410, and optical loss could therefore occur.

In contrast, the wavelength converter 623 according to the present embodiment allows the third component YL3 to be reflected off the reflection layer 600 and return into the light guide 410, whereby the amount of light that leaks via the side surfaces 412 of the light guide 410 can be reduced. The efficiency at which the fluorescence YL is used can therefore be improved.

The technical range of the present disclosure is not limited to the embodiments described above, and a variety of changes can be made to the technical range to the extent that the changes do not depart from the substance of the present disclosure. For example, the above embodiments and the variations have been described with reference to a transmissive wavelength converter in which the excitation light is incident on one side (lower side) of the phosphor and fluorescence exits via the other side (upper side) thereof. The present disclosure is also applicable to a reflective wavelength converter in which excitation light is incident on the upper side of the phosphor and fluorescence exits upward from the phosphor.

The configuration of a reflective wavelength converter will be described below as a variation of the wavelength converters described above. The present variation relates to a case where the wavelength converter 23 according to the first embodiment is converted into a reflective wavelength converter. Therefore, in the reflective wavelength converter according to the present variation, configurations common to those of the wavelength converter 23 have the same reference characters and will not be described in detail.

Figure 15:
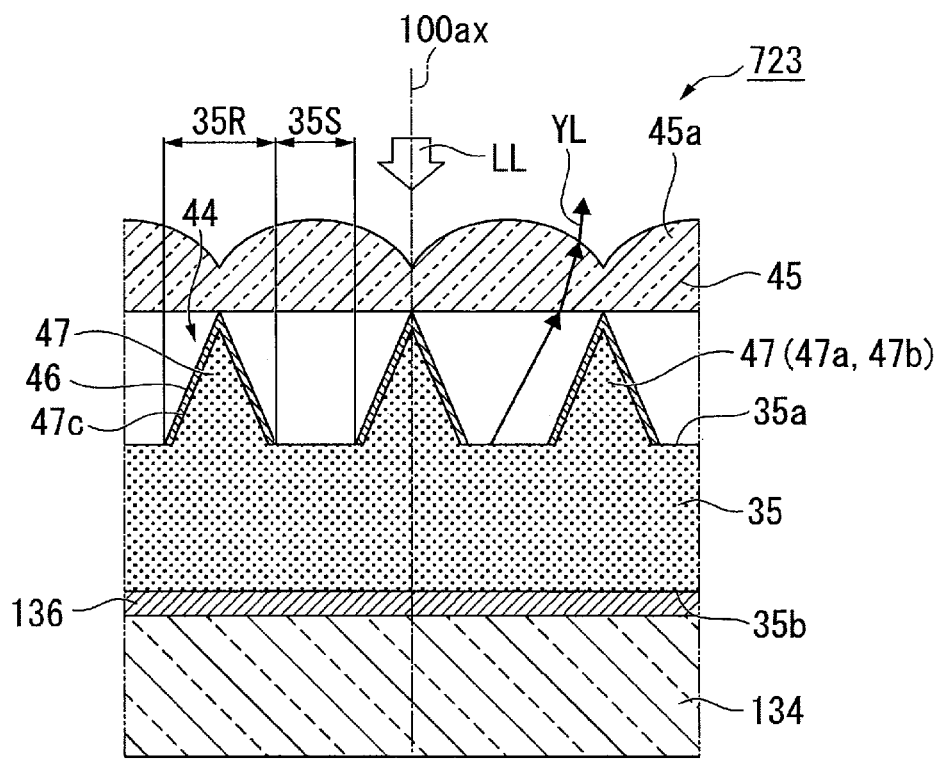
FIG. 15 is a cross-sectional view showing the configuration of a reflective wavelength converter.

FIG. 15 is a cross-sectional view showing the configuration of the reflective wavelength converter. A wavelength converter 723 includes a base 134, the phosphor 35, a reflection layer 136, the reflection structure 44, and the microlens 45, as shown in FIG. 15. The wavelength converter 723 according to the present embodiment is a reflective element in which the excitation light LL is incident on one side (lower side) of the phosphor and the fluorescence YL exits via the other side (upper side) thereof.

The base 134 is a plate-shaped member and is a support that supports the phosphor 35. The base 134 in the present embodiment is made of a metal material that conducts heat, for example, copper, and may or may not have optical transparency. The dichroic film 136 is provided between the base 134 and the phosphor 35. The reflection layer 136 is provided on the bottom surface 35b of the phosphor 35. The reflection layer 136 reflects the fluorescence YL generated by the phosphor 35 upward.

The effect of the wavelength converter 723 will subsequently be described. The excitation light LL passes through the microlens 45 and enters the light exiting regions 35S (light exiting surface 35a) of the phosphor 35, which are defined by the reflection structure 44. The excitation light LL enters the phosphor 35 via the light exiting regions 35S and generates the fluorescence YL in the phosphor 35. The majority of the fluorescence YL generated in the phosphor 35 exits via the light exiting regions 35S (light exiting surface 35a). Part of the fluorescence YL generated in the phosphor 35 travels downward, is then reflected off the reflection layer 136, and exits via the light exiting regions 35S (light exiting surface 35a).

Part of the fluorescence YL having exited via the light exiting regions 35S (light exiting surface 35a) passes through the microlens 45 and exits out of the wavelength converter 723, as shown in FIG. 15. The first component YL1 contained in the fluorescence YL and having a large exiting angle with respect to the light exiting surface 35a is reflected off the reflection layers 46.

The wavelength converter 723 according to the present embodiment, in which the reflection structure 44 reflects the first component YL1, which is part of the fluorescence YL and has a large exiting angle, allows a decrease in the radiation angle of the fluorescence YL and hence reduction in an increase in the etendue. Further, since the fluorescence YL exits out of the wavelength converter 723 via the microlens 45, the radiation angle of the fluorescence YL can be further reduced. The reduction in an increase in the etendue can therefore improve the efficiency at which the fluorescence YL is used. Further, since the wavelength converter 723 according to the present embodiment allows reduction in the etendue with no decrease in the excitation light incidence area of the phosphor 335 on which the excitation light LL is incident, the optical extinction due to an increase in optical density of the excitation light can be suppressed. The wavelength converter 723 according to the present embodiment therefore allows reduction in the etendue with the influence of the optical extinction suppressed.

The above description has been made of the case where the wavelength converter 23 according to the first embodiment is converted into a reflective wavelength converter byway of example. The wavelength converters 123, 123A, 123B, 223, 323, 423, 523, and 623 according to the other embodiments and variations may also be converted into a reflective wavelength converter.

The above embodiments have been described with reference to the case where the present disclosure is applied to a transmissive projector, and the present disclosure is also applicable to a reflective projector. The term "transmissive" used herein means that a liquid crystal light valve including a liquid crystal panel or any other component transmits light. The term "reflective" means that the liquid crystal light valve reflects light. The light modulators are not each limited to a liquid crystal light valve and may instead be a digital micromirror device.

Further, the above embodiments have been described with reference to the case where the light source apparatus according to the embodiment of the present disclosure is incorporated in a projector, but not necessarily. The light source apparatus according to the embodiment of the present disclosure may be used as a lighting apparatus, a headlight of an automobile, and other components.

What is claimed is:

1. A wavelength converter comprising:
    a wavelength conversion layer that converts excitation light in terms of wavelength to generate fluorescence, the wavelength conversion layer including a light exiting surface via which the fluorescence exits and a light entering surface via which the excitation light enters, the light exiting surface being on an opposite side of the wavelength conversion layer from the light entering surface; and a first reflection member including a reflection surface that reflects the fluorescence from the light exiting surface and is so provided as to incline with respect to the light exiting surface.

2. The wavelength converter according to claim 1, wherein the first reflection member is provided at the wavelength conversion layer.

3. The wavelength converter according to claim 1, further comprising a convex member made of a material different from a material of which the wavelength conversion layer is made and provided at a side facing the light exiting surface of the wavelength conversion layer,
wherein the first reflection member is provided at the convex member.

4. The wavelength converter according to claim 1, further comprising a translucent member that transmits the fluorescence and is provided at a side facing the light exiting surface of the wavelength conversion layer,
wherein the first reflection member is provided at the translucent member.

5. The wavelength converter according to claim 1, further comprising an optical element that is disposed at a side facing the light exiting surface of the wavelength conversion layer and changes a traveling direction of at least the fluorescence reflected off the first reflection member.

6. The wavelength converter according to claim 4, further comprising:
an optical element that is so disposed as to face the translucent member and changes a traveling direction of at least the fluorescence reflected off the first reflection member; and
a low-refractive-index layer provided between the translucent member and the optical element and having a refractive index smaller than a refractive index of the optical element.

7. The wavelength converter according to claim 1, further comprising:
a light guide that guides the fluorescence; and
a second reflection member that reflects the fluorescence to cause the reflected fluorescence to enter the light guide.

8. The wavelength converter according to claim 1, further comprising a light guide that guides the fluorescence,
wherein the first reflection member is buried in a light incident section of the light guide.

9. The wavelength converter according to claim 8, further comprising a third reflection member provided at a portion of a side surface of the light guide that is a portion close to the light incident surface.

10. The wavelength converter according to claim 7, wherein the second reflection member is so provided as to incline in such a way that an amount by which the second reflection member separates away from a center axis of the light guide increases with distance from the light exiting surface of the wavelength conversion layer in a direction of the center axis.

11. The wavelength converter according to claim 1, wherein a reflection region formed of a plurality of the first reflection members is a latticed region in a plan view along a direction in which the fluorescence exits.

12. A light source apparatus comprising:
a light source that outputs excitation light; and
the wavelength converter according to claim 1.

13. A projector comprising:
the light source apparatus according to claim 12;
a light modulator that modulates light outputted from the light source apparatus in accordance with image information; and
a projection optical apparatus that projects the light modulated by the light modulator.

* * * * *